United States Patent
Lee et al.

(10) Patent No.: US 9,188,814 B2
(45) Date of Patent: Nov. 17, 2015

(54) DISPLAY DEVICE AND METHOD OF MANUFACTURING THE SAME

(71) Applicant: SAMSUNG DISPLAY CO., LTD., Yongin, Gyeonggi-do (KR)

(72) Inventors: A Ram Lee, Hwaseong-si (KR); Woo Yong Sung, Seoul (KR); Tae Gyun Kim, Seoul (KR); Seung-Yeon Chae, Hwaseong-si (KR); Sang Gun Choi, Suwon-si (KR); Tae Woon Cha, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 162 days.

(21) Appl. No.: 13/861,002

(22) Filed: Apr. 11, 2013

(65) Prior Publication Data

US 2014/0160419 A1    Jun. 12, 2014

(30) Foreign Application Priority Data

Dec. 10, 2012 (KR) .................. 10-2012-0142972

(51) Int. Cl.
 *G02F 1/1339* (2006.01)
 *G02F 1/1341* (2006.01)
 *G02F 1/1333* (2006.01)

(52) U.S. Cl.
 CPC ........ *G02F 1/1341* (2013.01); *G02F 1/133305* (2013.01); *G02F 2201/501* (2013.01)

(58) Field of Classification Search
 CPC .................................... G02F 1/1341
 USPC ................................. 349/153, 156
 See application file for complete search history.

(56) References Cited

U.S. PATENT DOCUMENTS

| | | | |
|---|---|---|---|
| 6,013,339 A | 1/2000 | Yamada et al. | |
| 6,141,072 A | 10/2000 | Drabik et al. | |
| 7,678,433 B2 | 3/2010 | Ochi et al. | |
| 8,247,809 B2 | 8/2012 | Kim | |

(Continued)

FOREIGN PATENT DOCUMENTS

| | | |
|---|---|---|
| JP | 11-095232 | 4/1999 |
| JP | 2002-088228 | 3/2002 |

(Continued)

OTHER PUBLICATIONS

English Abstract for Publication No. 10-2012-0046427.
English Abstract for Publication No. 11-095232.
English Abstract for Publication No. 2002-088228.
English Abstract for Publication No. 2005-116535.

(Continued)

*Primary Examiner* — Nathanael R Briggs
(74) *Attorney, Agent, or Firm* — F. Chau & Associates, LLC

(57) ABSTRACT

A display device and a method of manufacturing the display device are provided. Moisture may be prevented from penetrating into the display device. The display device includes a substrate including a pixel area. A thin film transistor is formed on the substrate. A pixel electrode is connected to the thin film transistor and formed in the pixel area. A roof layer is formed on the pixel electrode. The roof layer is separated from the pixel electrode via a microcavity. A liquid crystal layer fills the microcavity. A liquid crystal injection hole is formed in the roof layer and exposes a portion of the microcavity. An encapsulation layer is formed on the roof layer. The encapsulation layer covers the liquid crystal injection hole and seals the microcavity for the pixel area. The encapsulation layer includes a multilayer structure.

23 Claims, 27 Drawing Sheets

(56) References Cited

U.S. PATENT DOCUMENTS

| | | |
|---|---|---|
| 2005/0253490 A1 | 11/2005 | Ehrlich |
| 2007/0215663 A1 | 9/2007 | Chongson et al. |
| 2010/0078058 A1 | 4/2010 | Nightingale et al. |
| 2011/0057174 A1 | 3/2011 | Nam |
| 2011/0228192 A1 | 9/2011 | Hollaway |
| 2011/0291117 A1 | 12/2011 | Kwack et al. |
| 2012/0062448 A1* | 3/2012 | Kim et al. ........................ 345/55 |
| 2012/0133275 A1 | 5/2012 | Lee et al. |

FOREIGN PATENT DOCUMENTS

| | | |
|---|---|---|
| JP | 2005-116535 | 4/2005 |
| JP | 2007-219364 | 8/2007 |
| KR | 2003-0044793 | 6/2003 |
| KR | 10-2006-0100899 | 9/2006 |
| KR | 10-2008-0098093 | 11/2008 |
| KR | 10-2009-0032361 | 4/2009 |
| KR | 10-2010-0105262 | 9/2010 |
| KR | 10-2012-0008360 | 1/2012 |
| KR | 10-2012-0012891 | 2/2012 |
| KR | 10-2012-0046427 | 5/2012 |

OTHER PUBLICATIONS

English Abstract for Publication No. 2007-219364.
English Abstract for Publication No. 2003-0044793.
English Abstract for Publication No. 10-2006-0100899.
English Abstract for Publication No. 10-2008-0098093.
English Abstract for Publication No. 10-2009-0032361.
English Abstract for Publication No. 10-2010-0105262.
English Abstract for Publication No. 10-2012-0012891.
English Abstract for Publication No. 10-2012-0008360.
Dong-Sing Wuu, et al. "Transparent Barrier Coatings on High Temperature Resisting Polymer Substrates for Flexible Electronic Applications," Journal of the Electrochemical Society, 157 (2) pp. C47-C51, 2010.
Sang-Hee Ko Park, et al., "Ultra Thin Film Encapsulation of Organic Light Emitting Diode on a Plastic Substrate," ETRI Journal, vol. 27, No. 5, Oct. 2005, pp. 545-550.
Sung-Noon Choi, et al., "Hybrid Passivation For a Film-Like Organic Light-Emitting Diode Using Parylene and Silicon Dioxide" Japanese Journal of Applied Physics, vol. 46, No. 2, 2007, pp. 810-814.
N. Kim, et al., "A Hybrid Encapsulation Method for Organic Electronics," Applied Physics Letters, 94, 2009, pp. 163308-1 to 163308-3.

* cited by examiner

DISPLAY DEVICE AND METHOD OF MANUFACTURING THE SAME

CROSS-REFERENCE TO RELATED APPLICATION

This application claims priority under 35 U.S.C. §119 to Korean Patent Application No. 10-2012-0142972 filed on Dec. 10, 2012 in the Korean Intellectual Property Office, the disclosure of which is incorporated by reference herein in its entirety.

TECHNICAL FIELD

Exemplary embodiments of the present invention relate to a display device, and particularly, to a display device and a method of manufacturing the same.

DISCUSSION OF THE RELATED ART

A liquid crystal display includes two panels on which pixel electrodes and a common electrode are formed and a liquid crystal layer disposed between the panels. A voltage is applied to a pixel electrode and the common electrode to generate an electric field across the liquid crystal layer. By the electric field, liquid crystal molecules in the liquid crystal layer are aligned to control the polarization of incoming light, thus displaying an image.

The two display panels of the liquid crystal display are also referred to as a thin film transistor array panel and an opposing display panel, respectively. The thin film transistor array panel includes gate lines through which gate signals are transmitted and data lines through which data signals are transmitted, and thin film transistors connected to the gate lines and the data lines. Pixel electrodes are connected to the thin film transistors. The opposing display panel may include light blocking members, color filters, a common electrode, etc. The light blocking members, the color filters, and the common electrodes may also be formed on the thin film transistor array panel.

Sometimes, moisture may penetrate into the liquid crystal display.

SUMMARY

A display device according to an exemplary embodiment of the present invention includes a substrate. The substrate includes a pixel area. A thin film transistor is formed on the substrate. A pixel electrode is connected to the thin film transistor and is formed in the pixel area. A roof layer is formed on the pixel electrode. The roof layer is separated from the pixel electrode via a microcavity. A liquid crystal layer fills the microcavity. A liquid crystal injection hole is formed in the roof layer and exposes a portion of the microcavity. An encapsulation layer is formed on the roof layer. The encapsulation layer covers the liquid crystal injection hole and seals the microcavity for the pixel area. The encapsulation layer includes a multilayer structure.

The encapsulation layer may include a first sub-encapsulation layer including an organic insulating material and a second sub-encapsulation layer including an inorganic insulating material.

The first sub-encapsulation layer may include perylene, silicone, and/or an ultraviolet (UV) sheet.

The second sub-encapsulation layer may include silicon oxide (SiOx) or silicon nitride (SiNx).

The first sub-encapsulation layer may have a thickness in a range of from substantially 0.5 µm to substantially 1 µm.

The second sub-encapsulation layer may have a thickness in a range of from substantially 20 nm to substantially 50 nm.

The second sub-encapsulation layer may be formed on the first sub-encapsulation layer.

The first sub-encapsulation layer may be formed on the second sub-encapsulation layer.

The encapsulation layer may include a plurality of first sub-encapsulation layers and a plurality of second sub-encapsulation layers. The first sub-encapsulation layers and the second sub-encapsulation layers may be alternately formed.

The encapsulation layer may further include a third sub-encapsulation layer including a metal oxide.

The third sub-encapsulation layer may include aluminum oxide ($Al_2O_3$).

The second sub-encapsulation layer may be formed on the first sub-encapsulation layer, and the third sub-encapsulation layer may be formed on the second sub-encapsulation layer.

The third sub-encapsulation layer may be formed between the first sub-encapsulation layer and the second sub-encapsulation layer.

The encapsulation layer may include a plurality of first sub-encapsulation layers, a plurality of second sub-encapsulation layers, and a plurality of third sub-encapsulation layers.

The encapsulation layer may include a first sub-encapsulation layer including an organic insulating material and a third sub-encapsulation layer including a metal oxide.

The encapsulation layer may include a plurality of first sub-encapsulation layers and a plurality of third sub-encapsulation layers. The first sub-encapsulation layer and the third sub-encapsulation layer may be alternately formed.

A self-assembled monolayer (SAM) may be formed on the encapsulation layer.

A buffer layer may be formed on the encapsulation layer. The buffer layer may include an organic insulating material.

A self-assembled monolayer (SAM) may be formed on the buffer layer.

A method of manufacturing a display device according to an exemplary embodiment of the present invention includes forming a thin film transistor on a substrate. The substrate includes a pixel area. A pixel electrode is connected to the thin film transistor in the pixel area. A sacrificial layer is formed on the pixel electrode. A roof layer is formed on the sacrificial layer. A liquid crystal injection hole is formed in the roof layer and exposes a portion of the sacrificial layer. The sacrificial layer is removed forming a microcavity between the pixel electrode and the roof layer. Liquid crystal is injected through the liquid crystal injection hole. An encapsulation layer is formed on the roof layer and seals the microcavity for each pixel area. The encapsulation layer includes a multilayer structure.

Forming the encapsulation layer may include forming a first sub-encapsulation layer including an organic insulating material and forming a second sub-encapsulation layer including an inorganic insulating material.

The encapsulation layer may include a plurality of first sub-encapsulation layers and a plurality of second sub-encapsulation layers. The first sub-encapsulation layers and the second sub-encapsulation layers may be alternately formed.

Forming the encapsulation layer may further include forming a third sub-encapsulation layer including a metal oxide.

Forming the encapsulation layer may include forming a first sub-encapsulation layer including an organic insulating material and forming a third sub-encapsulation layer including a metal oxide.

According to an exemplary embodiment of the present invention, a display device includes a first electrode and a second electrode. The second electrode at least partially overlaps the first electrode. A liquid crystal layer is formed between the first electrode and the second electrode. A roof layer is formed on the second electrode. A liquid crystal injection hole is formed through the second electrode, the liquid crystal layer, and the roof layer. At least two encapsulation layers are formed on the liquid crystal injection hole and the roof layer. The two encapsulation layers respectively include different materials from each other.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF EXEMPLARY EMBODIMENTS

Figure 1:
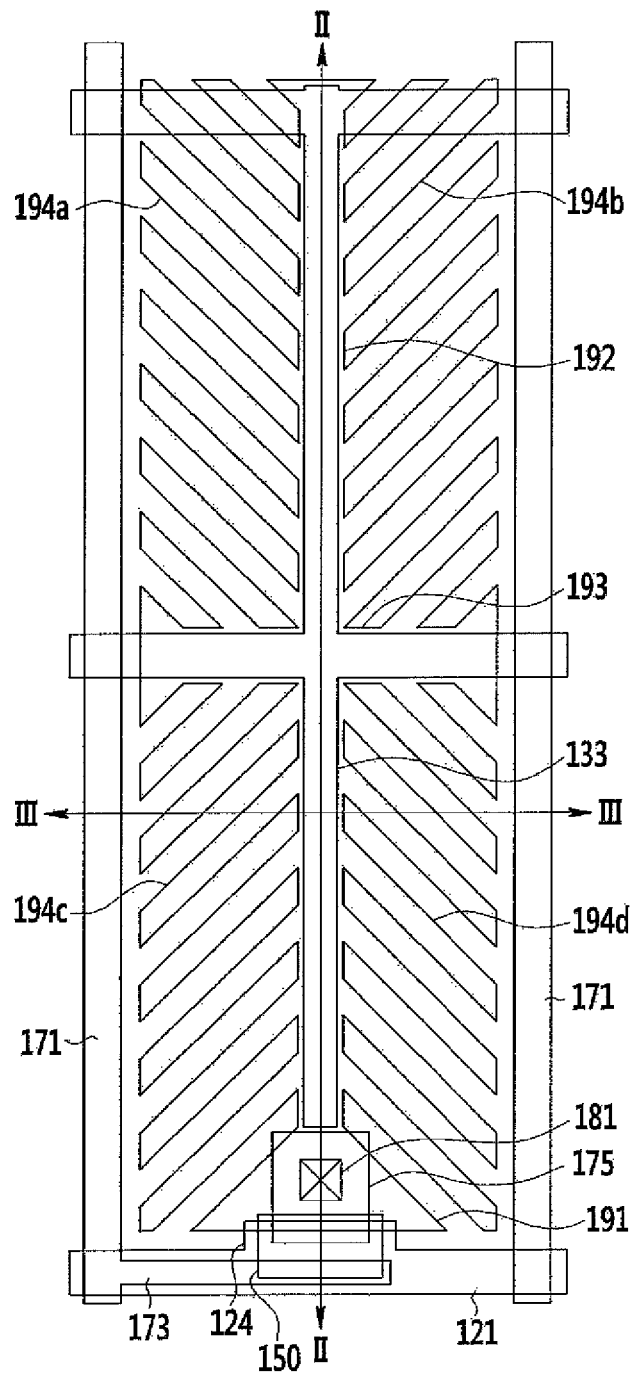
FIG. 1 is a top plan view illustrating one pixel of a display device according to an exemplary embodiment of the present invention.

Hereinafter, exemplary embodiments of the present invention will be described in further detail with reference to the accompanying drawings. The present invention may, however, be embodied in many different forms and should not be construed as being limited to the embodiments set forth herein.

Like reference numerals may designate like or similar elements throughout the specification and the drawings. It will be understood that when an element is referred to as being "on," "connected to," or "coupled to" another element, it can be directly on, connected to or coupled to the other element or intervening elements may also be present.

As used herein, the singular forms "a," "an," and "the" are intended to include the plural forms as well, unless the context clearly indicates otherwise.

Figure 2:
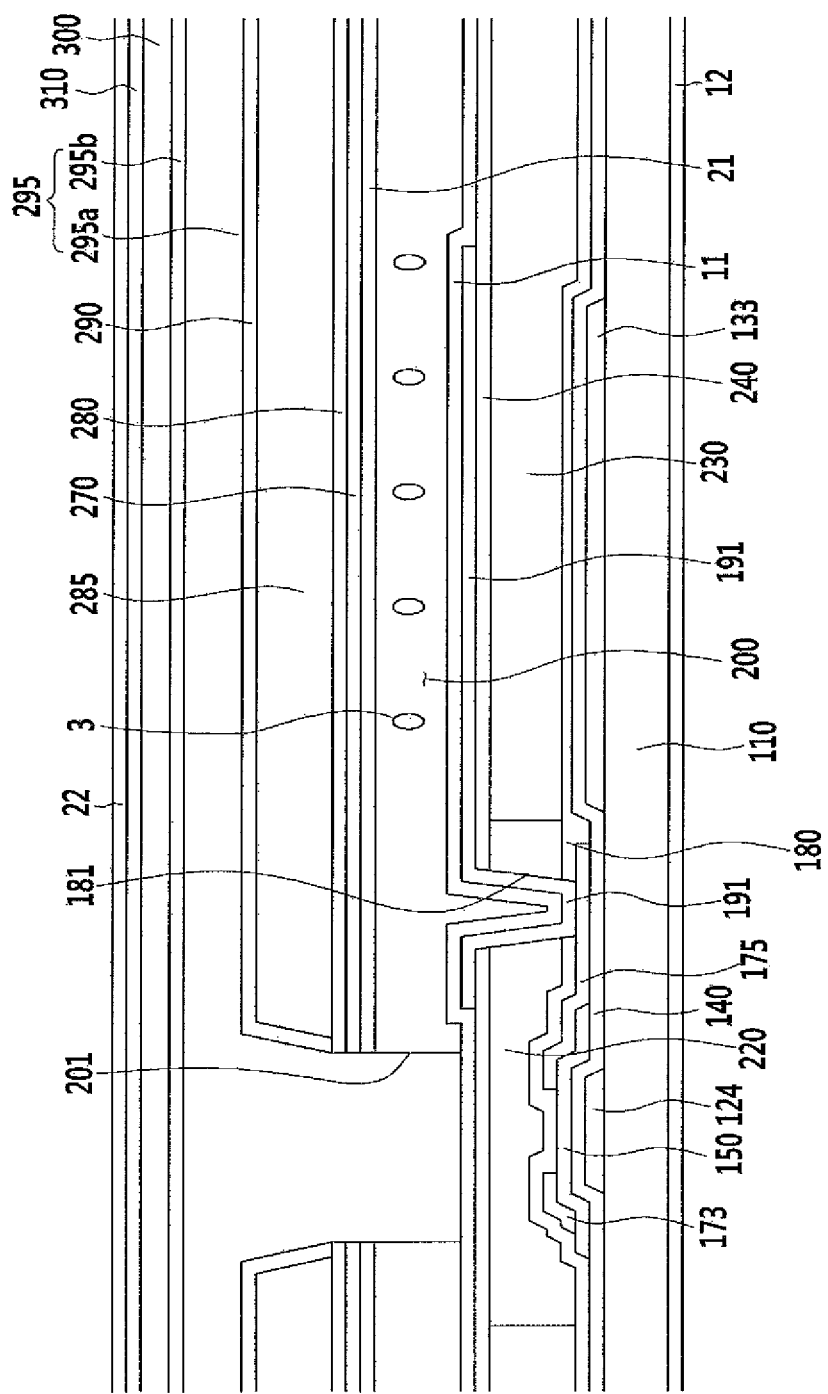
FIG. 2 is a cross-sectional view taken along the line II-II of FIG. 1.
Figure 3:
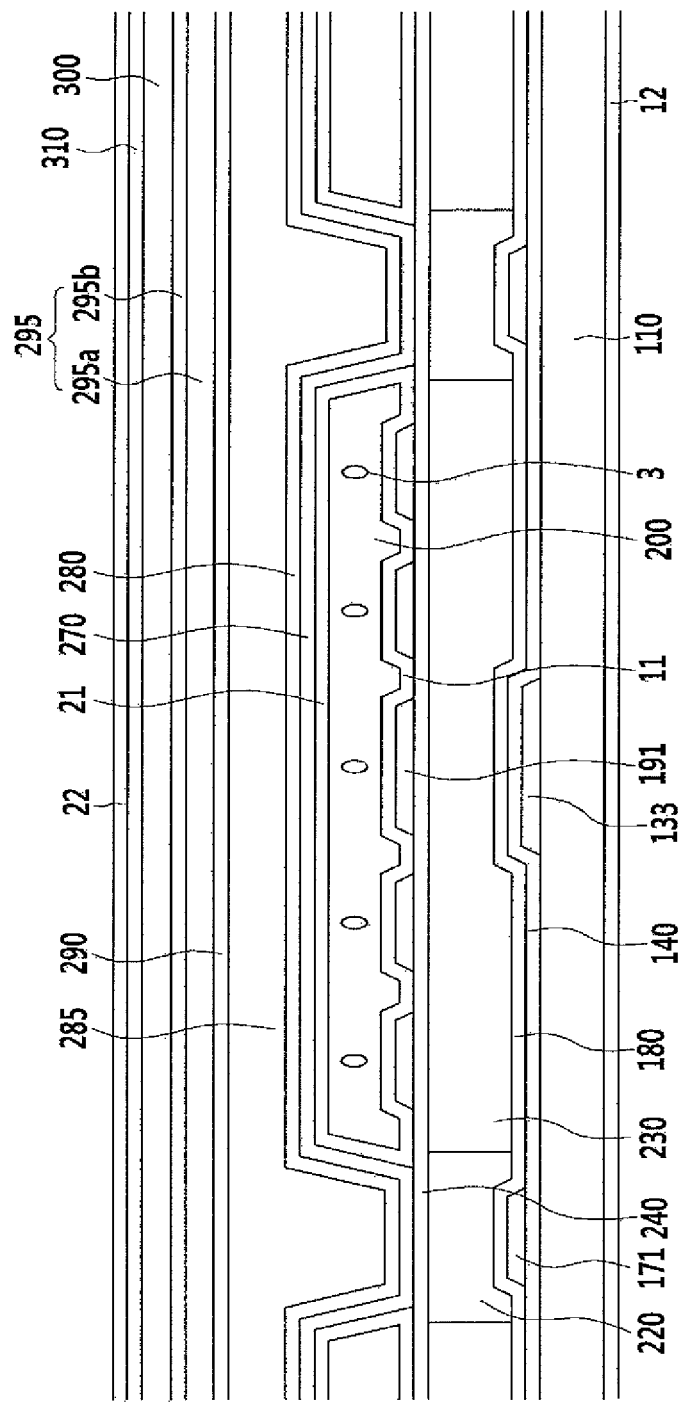
FIG. 3 is a cross-sectional view taken along the line III-III of FIG. 1.

FIG. 1 is a top plan view illustrating one pixel of a display device according to an exemplary embodiment of the present invention, FIG. 2 is a cross-sectional view taken along the line II-II of FIG. 1, and FIG. 3 is a cross-sectional view taken along the line III-III of FIG. 1.

A display device according to an exemplary embodiment of the present invention includes gate lines including a gate line 121 formed on a substrate 110 in a first direction, which is a transverse direction, and data lines including a data line 171 formed on the substrate 110 in a second direction substantially perpendicular to the first direction. The substrate 110 may be made of glass or plastic. The gate line 121 and the data line 171 may cross each other.

The substrate 110 includes a plurality of pixel areas that may be defined by the gate line 121 and the data line 171.

The gate line 121 extends in the transverse direction of the pixel. A gate signal is transmitted through the gate line 121. The gate line 121 includes a gate electrode 124 protruded therefrom. The gate electrode 124 is applied with a gate signal through the gate line 121.

A storage electrode 133 is not connected to the gate line 121 or the gate electrode 124. The storage electrode 133 may be formed in the pixel area. As shown in FIG. 1, the storage electrode 133 may be formed in a direction substantially parallel to the data line 171. For example, the storage electrode 133 may be extended in the second direction. Alternately, the storage electrode 133 may be formed in a direction substantially parallel to the gate line 121. For example, the storage electrode 133 may be extended in the first direction. A plurality of storage electrodes including the storage electrode 133 formed in neighboring pixel areas may be connected to each other. The storage electrode 133 may be applied with a predetermined voltage such as a common voltage.

A gate insulating layer 140 is formed on the gate line 121, the gate electrode 124, and the storage electrode 133. The gate insulating layer 140 may be made of an inorganic insulating material such as silicon nitride (SiNx) and/or silicon oxide (SiOx). Also, the gate insulating layer 140 may include a single layer or a multilayer structure.

A semiconductor layer 150 is formed on the gate insulating layer 140. The semiconductor layer 150 may be positioned on the gate electrode 124. The semiconductor layer 150 may be extended under the data line 171. The semiconductor layer 150 may be made of amorphous silicon, polycrystalline silicon, or a metal oxide.

A source electrode 173 protruded from the data line 171 and a drain electrode 175 separated from the source electrode 173 are formed on the semiconductor layer 150.

The data line 171 extends substantially in a longitudinal direction. A data signal is transmitted through the data line 171 to the source electrode 173.

The gate electrode 124, the semiconductor layer 150, the source electrode 173, and the drain electrode 175 form one thin film transistor. When the thin film transistor is in an ON state, a data signal applied to the source electrode 173 is transmitted to the drain electrode 175.

A passivation layer 180 is formed on the data line 171, the source electrode 173, the drain electrode 175, and the exposed semiconductor layer 150 between the drain electrode 175 and the drain electrode 173. The passivation layer 180 may be made of an organic insulating material or an inorganic insulating material and may have a single layer or a multilayer structure.

Color filters including a color filter 230 are formed in each pixel area on the passivation layer 180. The color filter 230 may be formed of an organic material. The color filter 230 may display one of the primary colors such as red, green, and blue. The color filter 230 is not limited to representing the three primary colors of red, green, and blue, and may also represent other colors such as cyan, magenta, yellow, and a white-containing color.

A light blocking member 220 is formed in a region between neighboring color filters 230. The light blocking member 220 is formed at the boundary of a pixel area P on the thin film transistor, thereby preventing light leakage.

A first insulating layer 240 may be further formed on the color filter 230 and the light blocking member 220. The first insulating layer 240 may be made of an inorganic insulating material such as silicon nitride (SiNx) and/or silicon oxide (SiOx). The first insulating layer 240 protects the color filter 230 and the light blocking member 220. The first insulating layer 240 may be alternatively omitted.

The first insulating layer 240, the light blocking member 220, and the passivation layer 180 have a contact hole 181 exposing a portion of the drain electrode 175. The contact hole 181 may be formed in the color filter 230 instead of the light blocking member 220.

A pixel electrode 191 connected to the drain electrode 175 through the contact hole 181 is formed on the first insulating layer 240. The pixel electrode 191 is formed in each pixel area and is connected to the drain electrode 175 thereby receiving a data signal from the drain electrode 175 when the thin film transistor is in the ON state. The pixel electrode 191 may be made of a transparent metal material such as indium-tin oxide (ITO) and/or indium-zinc oxide (IZO).

The pixel electrode 191 includes a transverse stem 193, a longitudinal stem 192 crossing the transverse stem 193, and a plurality of first to fourth minute branches 194a, 194b, 194c, and 194d.

The transverse stem 193 may be formed in a direction substantially parallel to the gate line 121, and the longitudinal stem 192 may be formed in a direction substantially parallel to the data line 171. The transverse stem 193 may be positioned substantially at the center between the two neighboring gate lines 121, and the longitudinal stem 192 may be positioned substantially at the center between the two neighboring data lines 171.

One pixel area is divided into a first sub-pixel area, a second sub-pixel area, a third sub-pixel area, and a fourth sub-pixel area by the transverse stem 193 and the longitudinal stem 192. The first sub-pixel area is positioned at the left side of the transverse stem 193 and at an upper side of the longitudinal stem 192, and the second sub-pixel area is positioned at the right side of the transverse stem 193 and at the upper side of the longitudinal stem 192. The third sub-pixel area is positioned at the left side of the transverse stem 193 and at the lower side of the longitudinal stem 192, and the fourth sub-pixel area is positioned at the right side of the transverse stem 193 and at the lower side of the longitudinal stem 192.

The first minute branches 194a are formed in the first sub-pixel area, and the second minute branches 194b are formed in the second sub-pixel area. The third minute branches 194c are formed in the third sub-pixel area, and the fourth minute branches 194d are formed in the fourth sub-pixel area.

The first minute branches 194a are obliquely extended from the transverse stem 193 or the longitudinal stem 192 in the left-upper direction, and the second minute branches 194b are obliquely extended from the transverse stem 193 or the longitudinal stem 192 in the right-upper direction. The third minute branches 194c are obliquely extended from the transverse stem 193 or the longitudinal stem 192 in the left-lower direction, and the fourth minute branches 194d are obliquely extended from the transverse stem 193 or the longitudinal stem 192 in the right-lower direction.

The first to fourth minute branches 194a-194d may form an angle of about 45 degrees or about 135 degrees with respect to the gate line 121 or the transverse stem 193. The first to fourth minute branches 194a-194d in neighboring sub-pixel areas form substantially right angles to one another.

The shape of the pixel electrode 191 is not limited thereto and various variations may be made thereto. Although one pixel area is divided into four sub-pixel areas as an example, the pixel area may be divided into five or more sub-pixel areas or the pixel area need not be divided into a plurality of sub-pixel areas.

A common electrode 270 separated from the pixel electrode 191 by a predetermined distance is formed on the pixel electrode 191. A microcavity 200 is formed between the pixel electrode 191 and the common electrode 270. The width and the area of the microcavity 200 may vary according to the resolution of the display device.

A liquid crystal layer including liquid crystal 3 is positioned in the microcavity 200. A plurality of liquid crystal molecules in the liquid crystal layer may be aligned in a direction substantially perpendicular to the substrate 110 when no electric field is applied to the liquid crystal layer. For example, "vertical alignment" may be realized. Alternatively, the liquid crystal molecules may be aligned in a direction substantially parallel to the substrate 110 when no electric field is applied to the liquid crystal layer. For example, "horizontal alignment" may be formed.

The liquid crystal layer may include nematic, smectic, cholesteric, and/or chiral liquid crystal materials. Further, the liquid crystal layer may include a negative liquid crystal material or a positive liquid crystal material.

The pixel electrode 191 is formed below the microcavity 200 and the common electrode 270 is formed above the microcavity 200, for example. However, exemplary embodiments of the present invention are not limited thereto. Alternatively, both the pixel electrode 191 and the common electrode 270 may be formed below the microcavity 200. In this case, the pixel electrode 191 and the common electrode 270 may be formed on the same or substantially the same layer or may be formed on different layers with an insulating layer therebetween. The liquid crystal layer may be formed in the microcavity 200, and the liquid crystal molecules may lie in a direction substantially parallel with the substrate 110.

A first alignment layer 11 is formed on the pixel electrode 191. The first alignment layer 11 may be formed on the first insulating layer 240 which is not covered by the pixel electrode 191.

A second alignment layer 21 is formed below the common electrode 270 and faces the first alignment layer 11.

The first alignment layer 11 and the second alignment layer 21 may be formed as vertical alignment layers and may be made of a material such as polyamic acid, polysiloxane, and polyimide. The first and second alignment layers 11 and 12 may be connected with each other at an edge of the pixel area.

The microcavity 200 is surrounded by the first insulating layer 240, the pixel electrode 191, and the common electrode 270. The common electrode 270 directly contacts the first insulating layer 240 at a portion overlapping the data line 171 and covers the left side and the right side of the microcavity 200 at a portion adjacent to the data line 171. Accordingly, the common electrode 270 is formed along adjacent pixel areas in a row direction.

The common electrode 270 is not formed at a portion overlapping the gate line 121 and does not cover the upper side and the lower side of the microcavity 200 at a portion adjacent to the gate line 121. Accordingly, a liquid crystal injection hole 201 is formed through the microcavity 200, and the microcavity 200 is exposed through the liquid crystal injection hole 201. The liquid crystal injection hole 201 is formed along the gate line 121, and the liquid crystal 3 is injected into the microcavity 200 through the liquid crystal injection hole 201.

For example, the common electrode 270 covers the left side and the right side of the microcavity 200 and does not cover the upper side and the lower side thereof. However, exemplary embodiments of the present invention are not limited thereto, and the common electrode 270 may also cover other sides of the microcavity 200. For example, the common electrode 270 covers the upper side and the lower side of the microcavity 200 and does not cover the left side and the right side thereof. In this case, the liquid crystal injection hole 201 may be formed along the data line 171.

A second insulating layer 280 may be further formed on the common electrode 270. The second insulating layer 280 may be made of an inorganic insulating material such as silicon nitride (SiNx) and/or silicon oxide (SiOx). Alternatively, the second insulating layer 280 may be omitted.

A roof layer 285 is formed on the second insulating layer 280. The roof layer 285 may be made of an organic material. The microcavity 200 is formed below the roof layer 285, and a shape of the microcavity 200 may be maintained by the roof layer 285. To expose a portion of the microcavity 200 outside the roof layer 285, the liquid crystal injection hole 201 may also be formed at the roof layer 285.

A third insulating layer 290 may be further formed on the roof layer 285. The third insulating layer 290 may be made of an inorganic insulating material such as silicon nitride (SiNx) or silicon oxide (SiOx). The third insulating layer 290 may cover the upper surface and the side surface of the roof layer 285. The third insulating layer 290 protects the roof layer 285 made of an organic material. Alternatively, the third insulating layer 20 may be omitted.

An encapsulation layer 295 may be formed on the third insulating layer 290. The encapsulation layer 295 covers the liquid crystal injection hole 201 through which the microcavity 200 is exposed. The third insulating layer 290 may seal the liquid crystal injection hole 201, thus preventing leakage of the liquid crystal 3 formed in the microcavity 200. The encapsulation layer 295 contacts the liquid crystal 3. The encapsulation layer 295 may be made of a material which does not react with the liquid crystal 3.

The encapsulation layer 295 may include a multilayer structure such as a dual layer structure or a triple layer structure. The dual layer includes two layers made of different materials from each other. The triple layer includes three layers, and two adjacent layers of the three layers are different from each other.

The encapsulation layer 295, as shown in FIG. 2 and FIG. 3, includes a first sub-encapsulation layer 295a made of an organic insulating material and a second sub-encapsulation layer 295b made of an inorganic insulating material.

The first sub-encapsulation layer 295a is made of an organic insulating material such as parylene and/or silicone. The first sub-encapsulation layer 29a may include an ultra violet (UV) sheet. The first sub-encapsulation layer 295a may have a thickness of more than about 0.5 μm to less than about 1 μm.

The second sub-encapsulation layer 295b is made of the inorganic insulating material such as silicon oxide (SiOx) or silicon nitride (SiNx). The second sub-encapsulation layer 295b may have a thickness of more than about 20 nm to less than about 50 nm.

The first sub-encapsulation layer 295a may be formed on the third insulating layer 290, and the second sub-encapsulation layer 295b may be formed on the first sub-encapsulation layer 295a. Exemplary embodiments of the present invention are not limited thereto. For example, the second sub-encapsulation layer 295b may be formed on the third insulating layer 290 and the first sub-encapsulation layer 295a may be formed on the second sub-encapsulation layer 295b.

An example of forming the encapsulation layer 295 of the single layer and an example of forming the encapsulation layer 295 of the multilayer structure are described.

As shown in Table 1, when the encapsulation layer 295 is made of an organic material such as perylene and/or silicone or the encapsulation layer 295a includes a UV sheet, a water vapor transmission rate is relatively high, and thus, moisture may penetrate into the microcavity 200 through the encapsulation layer 295. Accordingly, the liquid crystal 3 in the microcavity 200 may be influenced by the moisture.

Table 1 represents water vapor transmission rates according to materials and measuring conditions.

TABLE 1

| Material | Water vapor transmission rate (WVTR, g/m$^2$/day) | Condition |
| --- | --- | --- |
| Polarizer (TAC, PVA, protection film) | 10 to 35 | 60° C., 40% RH |
| silicon nitride 100 nm | $7 * 10^{-3}$ | 38° C., 85% RH |
| perylene (5 μm) | $8 * 10^{-2}$ to 5 | 40° C., 90% RH |
| UV sheet | 13.9 | 37° C., 90% RH |
| silicon | 1.7 to 47.5 | 37° C., 90% RH |
| alignment layer | 0.4 to 21 | 40° C., 37.8% RH |
| sealant | 20 | 38° C., 85% RH |
| substrate | $10^{-6}$ to $5 * 10^{-5}$ | 85° C., 85% RH |

The inorganic material such as silicon nitride includes particles that are densely distributed compared with the organic material and thus has relatively low water vapor transmission rate. In an exemplary embodiment of the present invention, since the encapsulation layer 250 includes the first sub-encapsulation layer 295a made of an organic material such as perylene or silicone or including a UV sheet and the second sub-encapsulation layer 295b made of an inorganic material such as silicon nitride, the water vapor transmission rate may be reduced by the second sub-encapsulation layer 295b.

The encapsulation layer 295 includes the first sub-encapsulation layer 295a made of an organic insulating material and the second sub-encapsulation layer 295b made of an inorganic insulating material, for example. However, the exemplary embodiments of the present invention are not limited thereto. For example, the encapsulation layer 295 may include a third sub-encapsulation layer made of a metal oxide instead of the second sub-encapsulation layer 295b. The third sub-encapsulation layer may be made of a metal oxide such as aluminum oxide ($Al_2O_3$). The encapsulation layer 295 includes a layer made of the metal oxide, thereby further decreasing the water vapor transmission rate.

A buffer layer 300 made of an organic material may be further formed on the encapsulation layer 295, and a self-assembled monolayer (SAM) 310 may be further formed on the buffer layer 300.

The buffer layer 300 may be made of the same or substantially the same material as the first sub-encapsulation layer 295a. For example, the buffer layer 300 may be formed of an organic material such as perylene, a UV sheet, and/or silicone. Alternatively, the buffer layer 300 may be omitted, and the self-assembled monolayer 310 may be formed on the encapsulation layer 295.

The self-assembled monolayer 310 refers to an organic molecule layer formed on a surface in which organic molecules are orderly arranged. A surfactant molecule used for manufacturing the self-assembled monolayer 310 is made of three parts. The three parts of the surfactant molecule includes a reactive group of a head part coupled to a base material, an alkane chain of a long body part that may form a molecule layer, and a functional group of a tail part determining a function of the molecule layer. An example of the functional group is an alkyl group. Other groups (for example, $NH_2$, OH, COOH, etc.) may provide predetermined functions to the molecule layer.

A surface of the self-assembled monolayer 310 is hydrophobic and thus the water vapor transmission rate by which moisture penetrates into the microcavity 200 may be further decreased.

Polarizers 12 and 22 may be further attached on lower and upper surfaces of the display device. The polarizers 12 and 22 may include the first polarizer 12 and the second polarizer 22. The first polarizer 12 may be attached on the lower surface of the substrate 110, and the second polarizer 22 may be attached on a member that is finally formed among the members formed on the substrate 110.

For example, when the member that is finally formed on the substrate 110 is the encapsulation layer 295, the second polarizer 22 may be attached on the encapsulation layer 295. In this case, when detaching the second polarizer 22 from the encapsulation layer 295, the encapsulation layer 295 may also be detached.

When forming the encapsulation layer 295 on the substrate 110 and forming the self-assembled monolayer 310 on the encapsulation layer 295, the second polarizer 22 may be attached to the self-assembled monolayer 310. In this case, when detaching the second polarizer 22 from the self-assembled monolayer 310, the second polarizer 22 may be easily separated from the self-assembled monolayer 310. As such, the display device according to an exemplary embodiment of the present invention further includes the self-assembled monolayer 310 and thus a process of reattaching the polarizer may be easily performed.

Figure 4:
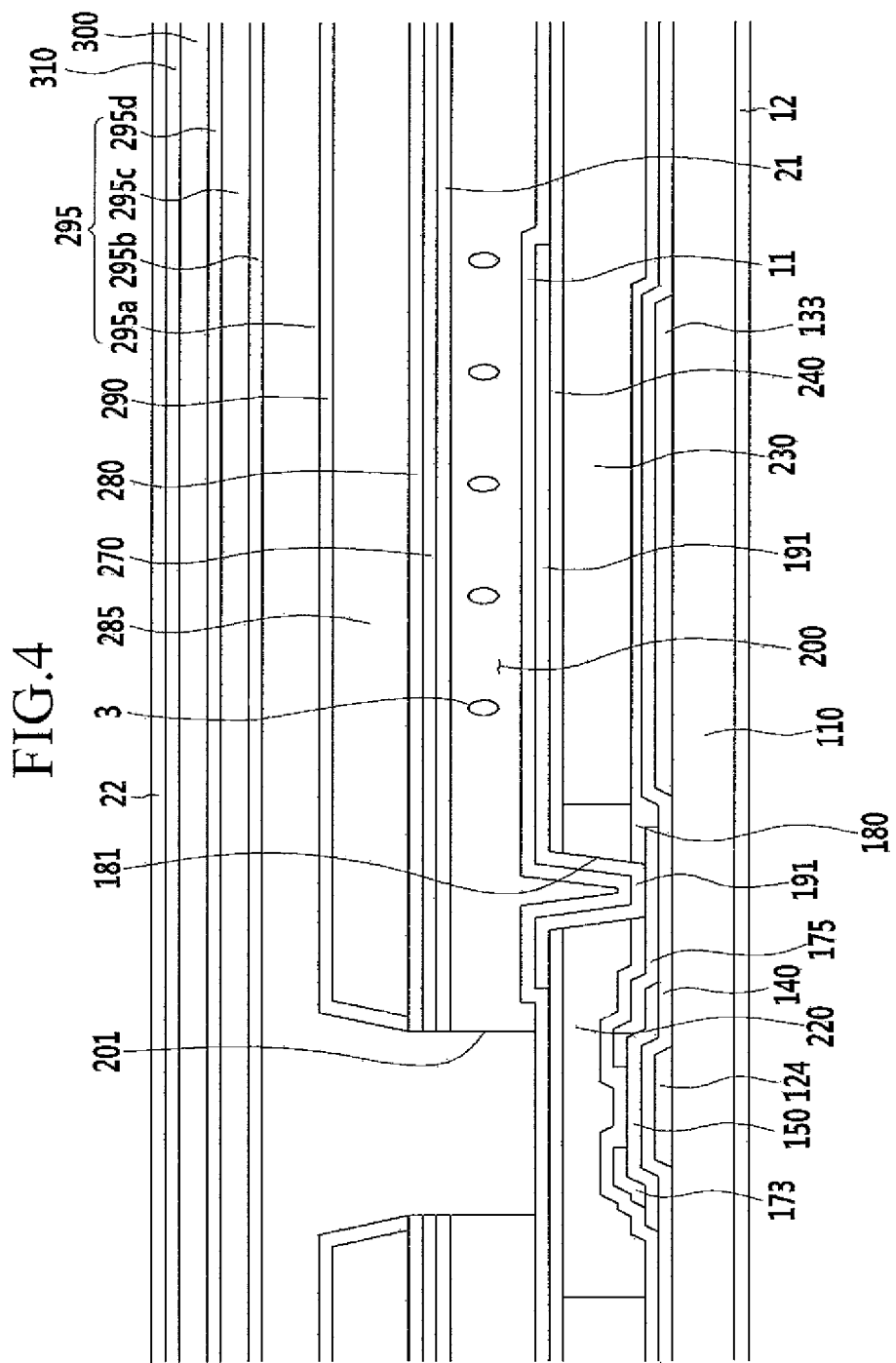
FIG. 4 to FIG. 7 are cross-sectional views illustrating a display device according to an exemplary embodiment the present invention.
Figure 5:
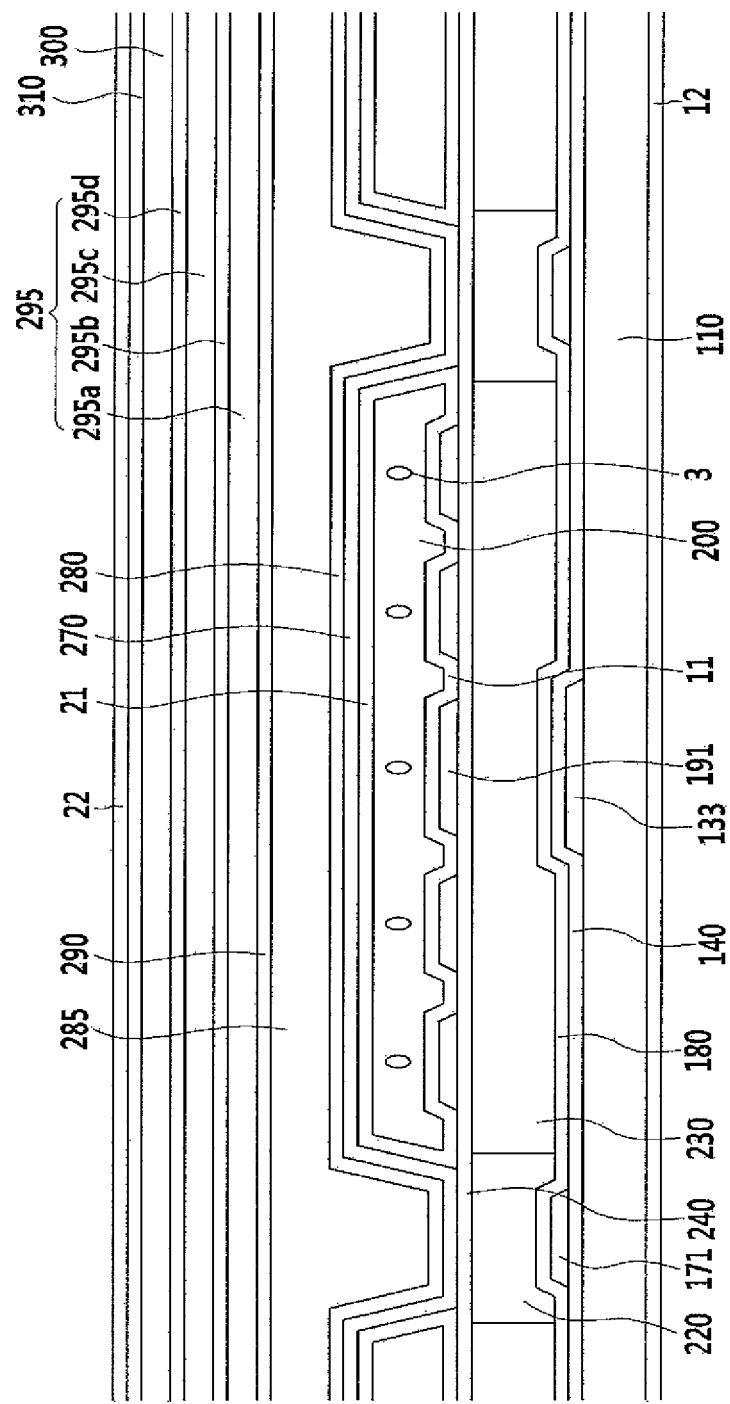

FIG. 4 and FIG. 5 are different cross-sectional views illustrating a display device according to an exemplary embodiment of the present invention.

In the display device according to an exemplary embodiment of the present invention, a thin film transistor and a pixel electrode 191 connected to the thin film transistor are formed on the substrate 110. A roof layer 285 is formed on the pixel electrode 191, with a microcavity 200 positioned between the roof layer 285 and the pixel electrode 191. The roof layer 285 has the liquid crystal injection hole 201 that exposes the microcavity 200. The microcavity 200 is filled with liquid crystal 3. The encapsulation layer 295 covering the liquid crystal injection hole 201 is formed on the roof layer 285, and the encapsulation layer 295 seals the microcavity 200 for each pixel area.

In the exemplary embodiment described above in connection with FIGS. 1 to 3, the encapsulation layer 295 includes one first sub-encapsulation layer 295a and one second sub-encapsulation layer 295b. However in the exemplary embodiment described in connection with FIGS. 4 and 5, the encapsulation layer 295 includes two first sub-encapsulation layers 295a and 295c and two second sub-encapsulation layers 295b and 295d.

The first sub-encapsulation layers 295a and 295c and the second sub-encapsulation layers 295b and 295d are alternately formed. The first sub-encapsulation layer 295a is formed on the third insulating layer 290 and the second sub-encapsulation layer 295b is formed on the first sub-encapsulation layer 295a. The first sub-encapsulation layer 295c is formed on the second sub-encapsulation layer 295b and the second sub-encapsulation layer 295d is formed on the first sub-encapsulation layer 295c.

A plurality of the first sub-encapsulation layers 295a and 295c and the second sub-encapsulation layers 295b and 295d are alternately formed, and thus, the moisture may be prevented from penetrating into the microcavity 200 through the encapsulation layer 295.

As shown in FIG. 4 and FIG. 5, the encapsulation layer 295 includes two first sub-encapsulation layers 295a and 295c and two second sub-encapsulation layers 295b and 295d, for example. However, exemplary embodiments of the present invention are not limited thereto. For example, the encapsulation layer 295 may include three or more first sub-encapsulation layers and three or more second sub-encapsulation layers.

After forming the encapsulation layer 295, an annealing process may be additionally performed. When the annealing process is additionally performed, the penetration of the moisture may be further prevented.

Referring to Table 2, the water vapor transmission rates according to materials of the first sub-encapsulation layer and the second sub-encapsulation layer, the number of pairs of the first sub-encapsulation layer and the second sub-encapsulation layer, and whether an annealing process is performed are described.

TABLE 2

| Material | Number of pairs of the first and second sub-encapsulation layer | Water vapor transmission rate (WVTR, g/m$^2$/day) | |
|---|---|---|---|
| | | No annealing process | Annealing process |
| silicon nitride/ perylene | 1 | $(6 \pm 2.1) * 10^{-3}$ | $(3 \pm 1.0) * 10^{-3}$ |
| | 2 | $(6 \pm 2.5) * 10^{-4}$ | $(1 \pm 0.3) * 10^{-4}$ |
| | 3 | $(6 \pm 0.6) * 10^{-4}$ | $(7 \pm 5.0) * 10^{-6}$ |
| | 4 | $(5 \pm 2.8) * 10^{-5}$ | $(7 \pm 5.1) * 10^{-6}$ |
| silicon oxide/ perylene | 3 | $(7 \pm 3.0) * 10^{-4}$ | $(7 \pm 3.1) * 10^{-5}$ |

As the number of pairs of the first sub-encapsulation layer and the second sub-encapsulation layer is increased, the water vapor transmission rate is decreased. Also, the water vapor transmission rate is further decreased when an annealing process is performed as compared with when no annealing process is carried out.

In Table 2 above, the encapsulation layer includes a plurality of the first sub-encapsulation layers of an organic insulating material and a plurality of the second sub-encapsulation layers of an inorganic insulating material. However, exemplary embodiments of the present invention are not limited thereto. For example, the encapsulation layer may include a plurality of the third sub-encapsulation layers made of a metal oxide instead of the plurality of the second sub-encapsulation layers. The third sub-encapsulation layer may be made of a metal oxide such as aluminum oxide ($Al_2O_3$).

The first sub-encapsulation layer and the third sub-encapsulation layer may be alternately formed.

The encapsulation layer may have a structure in which the second sub-encapsulation layer is formed on the first sub-encapsulation layer, the first sub-encapsulation layer is again formed on the second sub-encapsulation layer, and the third sub-encapsulation layer is formed on the first sub-encapsulation layer.

Figure 6:
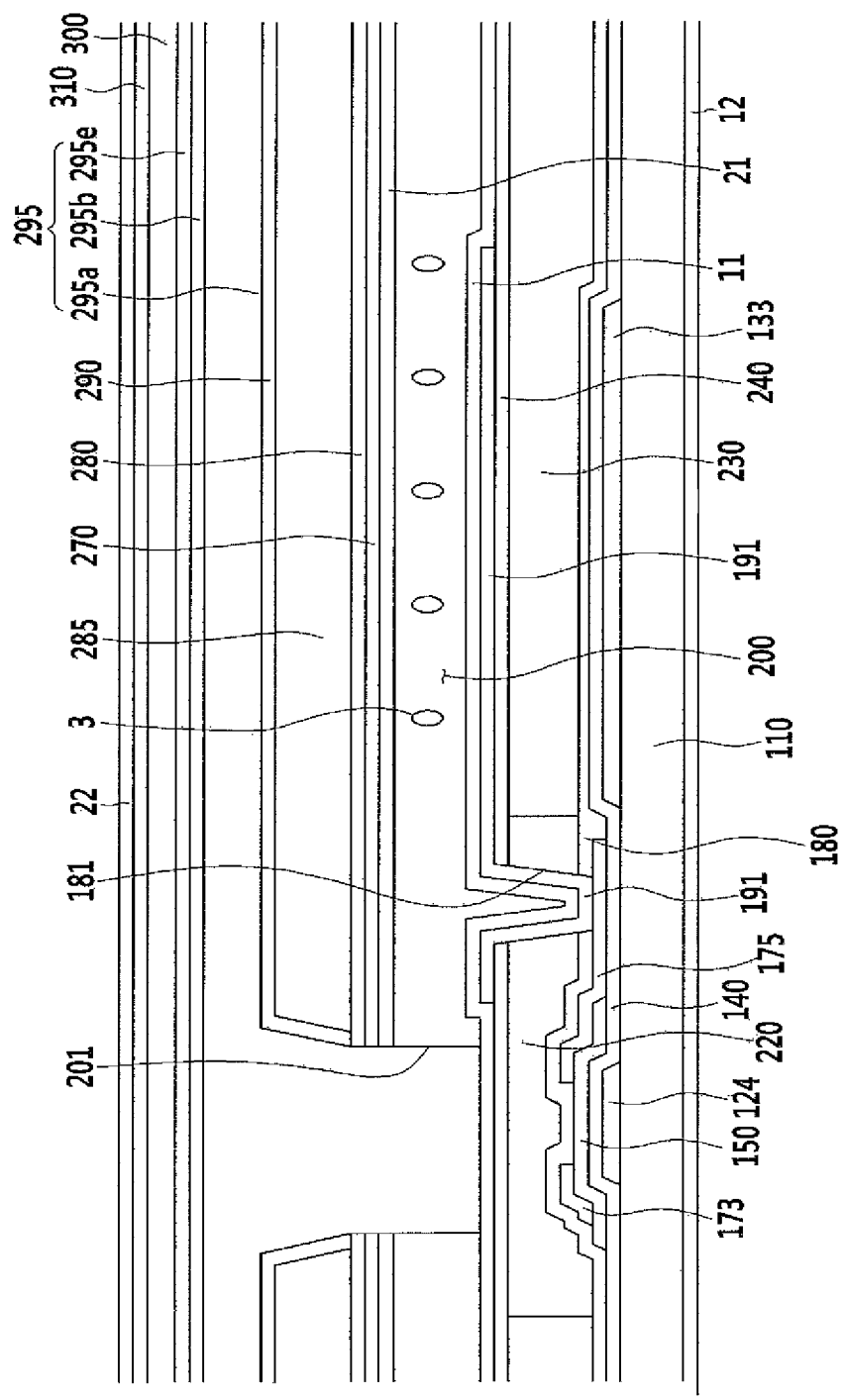
Figure 7:
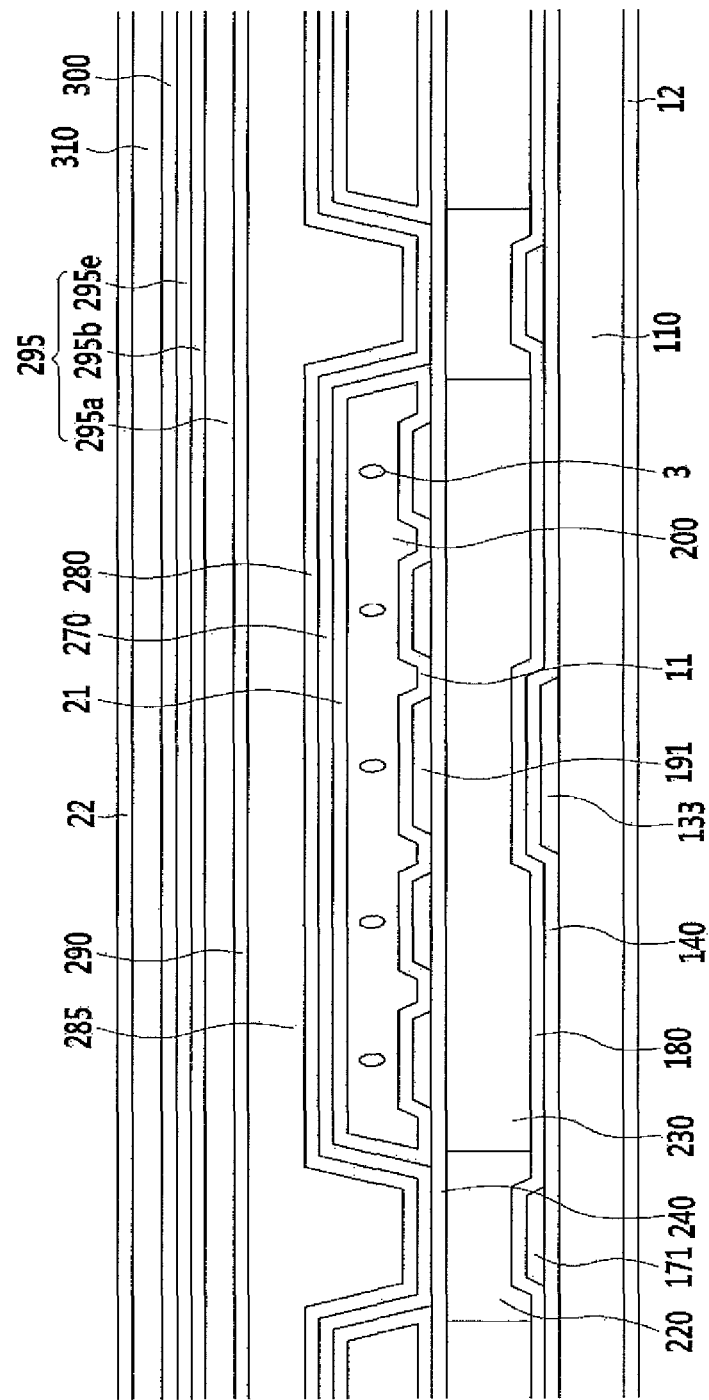

FIG. 6 and FIG. 7 are cross-sectional views illustrating a display device according to an exemplary embodiment of the present invention as taken along different lines from each other.

In the display device according to an exemplary embodiment of the present invention, a thin film transistor and a pixel electrode 191 connected to the thin film transistor are formed on a substrate 110. A roof layer 285 is formed on the pixel electrode 191, with a microcavity 200 positioned between the roof layer 285 and the pixel electrode 191. The roof layer 285 has a liquid crystal injection hole 201 that exposes the microcavity 200. The microcavity 200 is filled with liquid crystal 3.

The encapsulation layer 295 covering the liquid crystal injection hole 201 is formed on the roof layer 285, and the encapsulation layer 295 seals the microcavity 200 for each pixel area.

In the exemplary embodiment described above in connection with FIGS. 1 to 3, the encapsulation layer 295 includes the first sub-encapsulation layer 295a made of an organic insulating material and the second sub-encapsulation layer 295b made of an inorganic insulating material. However, in the exemplary embodiment described in connection with FIGS. 6 and 7, the encapsulation layer 295 includes the first sub-encapsulation layer 295a, the second sub-encapsulation layer 295b, and a third sub-encapsulation layer 295e.

The first sub-encapsulation layer 295a is made of an organic insulating material, the second sub-encapsulation layer 295b is made of an inorganic insulating material, and the third sub-encapsulation layer 295e is made of a metal oxide such as aluminum oxide ($Al_2O_3$).

The encapsulation layer 295 further includes the third sub-encapsulation layer 295e made of a metal oxide and thus the moisture may be further prevented from penetrating into the microcavity 200 through the encapsulation layer 295.

As shown in FIG. 6 and FIG. 7, the first sub-encapsulation layer 295a is formed on the third insulating layer 290, the second sub-encapsulation layer 295b is formed on the first sub-encapsulation layer 295a, and the third sub-encapsulation layer 295e is formed on the second sub-encapsulation layer 295b. However, exemplary embodiments of the present invention are not limited thereto, and the sequence of the first sub-encapsulation layer 295a, the second sub-encapsulation layer 295b, and the third sub-encapsulation layer 295e may be changed. For example, the third sub-encapsulation layer 295e may be formed on the first sub-encapsulation layer 295a, and the second sub-encapsulation layer 295b may be formed on the third sub-encapsulation layer 295e.

As shown in FIG. 6 and FIG. 7, the third insulating layer 290 includes one first sub-encapsulation layer 295a, one second sub-encapsulation layer 295b, and one third sub-encapsulation layer 295e, for example. However, exemplary embodiments of the present invention are not limited thereto. The third insulating layer 290 may include a plurality of first sub-encapsulation layers 295a, a plurality of second sub-encapsulation layers 295b, and a plurality of third sub-encapsulation layers 295e. In this case, the first sub-encapsulation layers 295a, the second sub-encapsulation layers 295b, and the third sub-encapsulation layers 295e may be repeatedly formed, e.g., in the order of a first sub-encapsulation layer 295a, a second sub-encapsulation layer 295b, and a third sub-encapsulation layer 295e.

FIG. 8 to FIG. 27 are cross-sectional views illustrating a method of manufacturing a display device according to an exemplary embodiment of the present invention. FIG. 8, FIG. 10, FIG. 12, FIG. 14, FIG. 16, FIG. 18, FIG. 20, FIG. 22, FIG. 24, and FIG. 26 are cross-sectional views taken along the same line. FIG. 9, FIG. 11, FIG. 13, FIG. 15, FIG. 17, FIG. 19, FIG. 21, FIG. 23, FIG. 25, and FIG. 27 are cross-sectional views taken along the same line.

Figure 8:
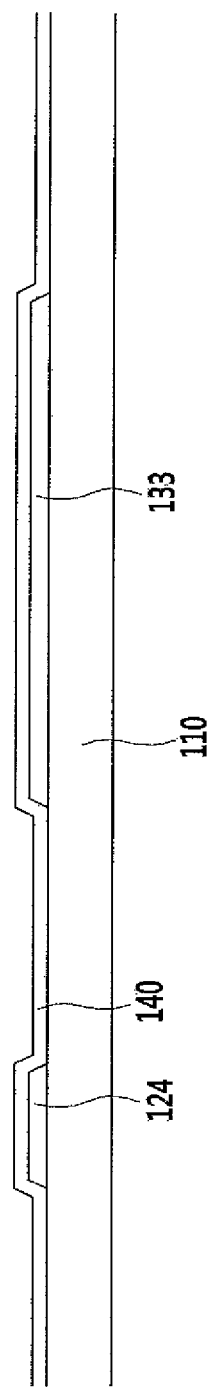
FIG. 8 to FIG. 27 are cross-sectional views illustrating a method of manufacturing a display device according to an exemplary embodiment of the present invention.
Figure 9:
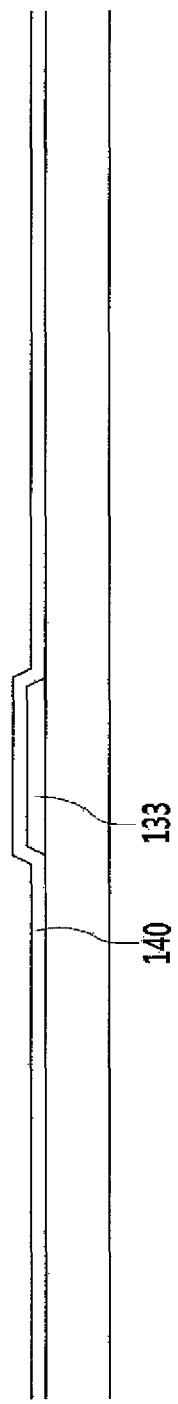
Figure 10:
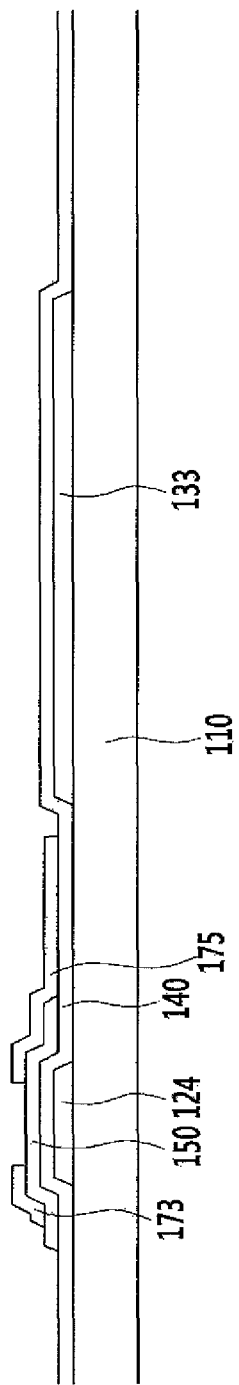

As shown in FIG. 8 and FIG. 9, a gate line extending in a direction and a gate electrode 124 protruded from the gate line are formed on a substrate 110 made of glass or plastic. A storage electrode 133 separated from the gate line 121 and the gate electrode 124 is formed. The storage electrode 133 may be formed of the same material as the gate line and the gate electrode 124.

A gate insulating layer 140 is formed of an inorganic insulating material, such as silicon oxide or silicon nitride, on an entire surface of the substrate 110 including the gate line 121, the gate electrode 124, and the storage electrode 133. The gate insulating layer 140 may include a single layer or a multilayer structure.

Figure 11:
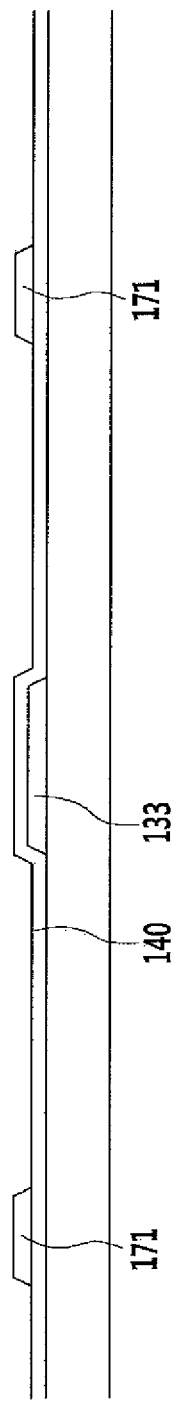
Figure 12:
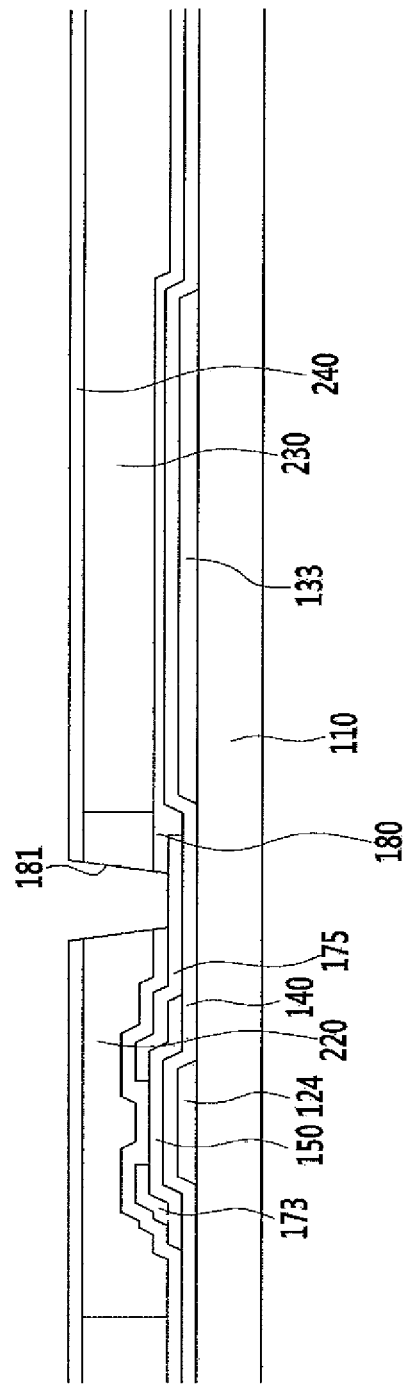

As shown in FIG. 11 and FIG. 12, a semiconductor material such as amorphous silicon, polycrystalline silicon, or a metal oxide is deposited on the gate insulating layer 140 and is patterned to thus form a semiconductor layer 150. The semiconductor layer 150 may be positioned on the gate electrode 124.

A metal layer is deposited on the gate insulating layer 140 and is patterned to thus form a data line 171 extending in another direction. A source electrode 173 protruded from the data line 171 on the semiconductor layer 150 and a drain electrode 175 separated from the source electrode 173 are formed. The metal layer may include a single layer or a multilayer structure.

A semiconductor material layer and a metal layer may be sequentially deposited on the gate insulating layer 140 and may be simultaneously patterned to thus form the semiconductor layer 150, the data line 171, the source electrode 173, and the drain electrode 175. The semiconductor layer 150 is extended under the data line 171.

The gate electrode 124, the semiconductor layer 150, the source electrode 173, and the drain electrode 175 form one thin film transistor. The gate line 121 and the data line 171 may cross each other. A plurality of pixel areas may be defined by gate lines including the gate line 121 and data lines including the data line 171.

Figure 13:
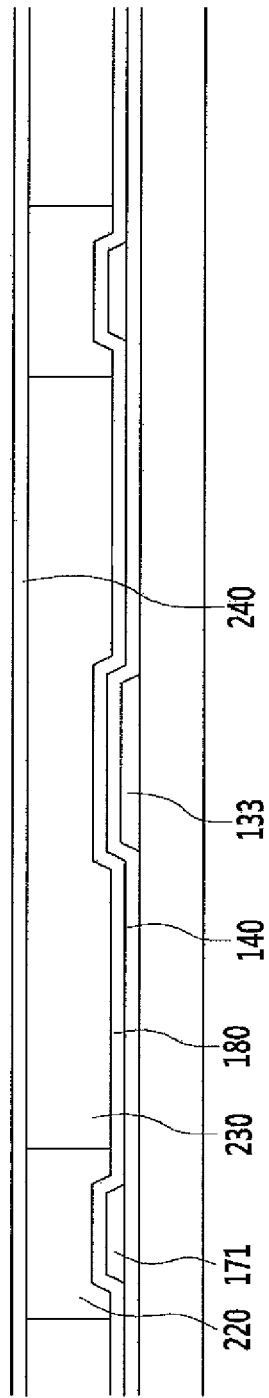

As shown in FIG. 12 and as FIG. 13, a passivation layer 180 is formed on the data line 171, the source electrode 173, the drain electrode 175, and the semiconductor layer 150 exposed between the source electrode 173 and the drain electrode 173. The passivation layer 180 may be made of an organic insulating material or an inorganic insulating material. The passivation layer 180 may include a single layer or a multilayer structure.

A color filter 230 is formed in each pixel area on the passivation layer 180. Color filters 230 of the same color may be formed along a column direction of a plurality of pixel areas. For example, when forming the color filters 230 of three colors including first, second, and third colors, the color filter 230 of the first color is formed and then the color filter 230 of the second color is formed by shifting a mask. After forming the color filter 230 of the second color, the color filter 230 of the third color may be formed by shifting the mask.

A light blocking member 220 is formed on the thin film transistor. The light blocking member 220 is formed at the boundary portion of the pixel areas on the passivation layer 180.

After forming the color filter 230, the light blocking member 220 is formed, for example. However, exemplary embodiments of the present invention are not limited thereto, and the color filter 230 may be formed after forming the light blocking member 220.

The first insulating layer 240 is formed of an inorganic insulating material such as silicon nitride (SiNx) or silicon oxide (SiOx) on the color filter 230 and the light blocking member 220.

The first insulating layer 240, the light blocking member 220, and the passivation layer 180 are etched forming a contact hole 181 exposing a portion of the drain electrode 175.

Figure 14:
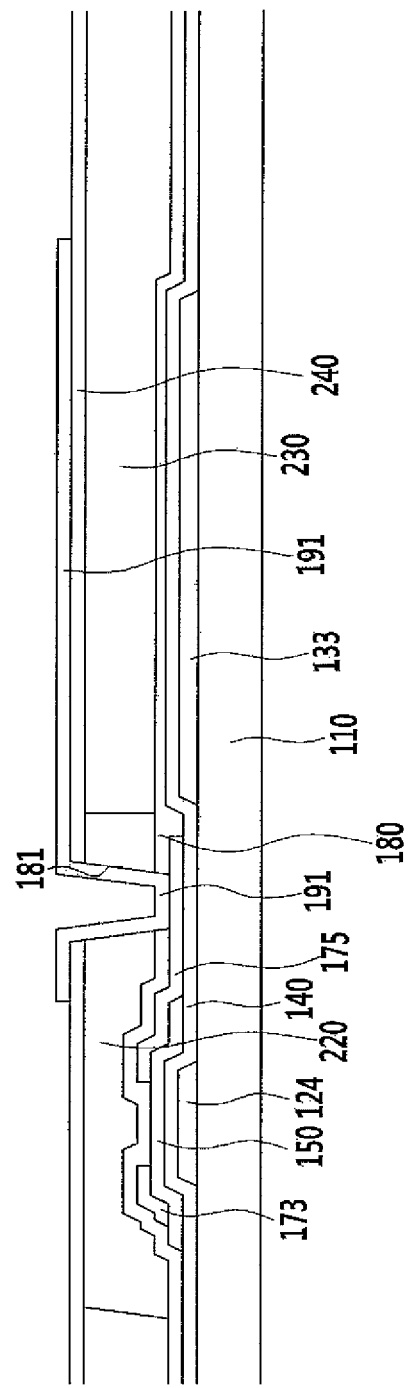
Figure 15:
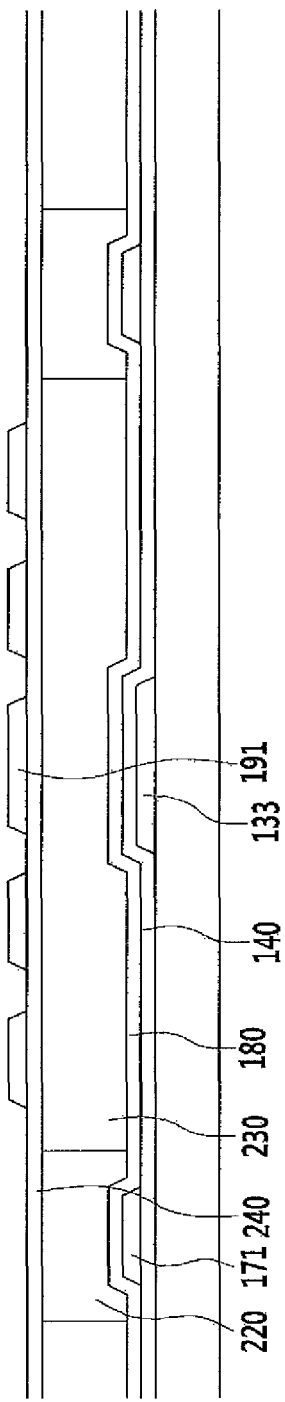

As shown in FIG. 14 and FIG. 15, a transparent metal layer including a metal such as indium-tin oxide (ITO) or indium-zinc oxide (IZO) is deposited and is patterned on the first insulating layer 240 to thus form a pixel electrode 191 in the pixel area. The pixel electrode 191 is connected to the drain electrode 175 through the contact hole 181.

Figure 16:
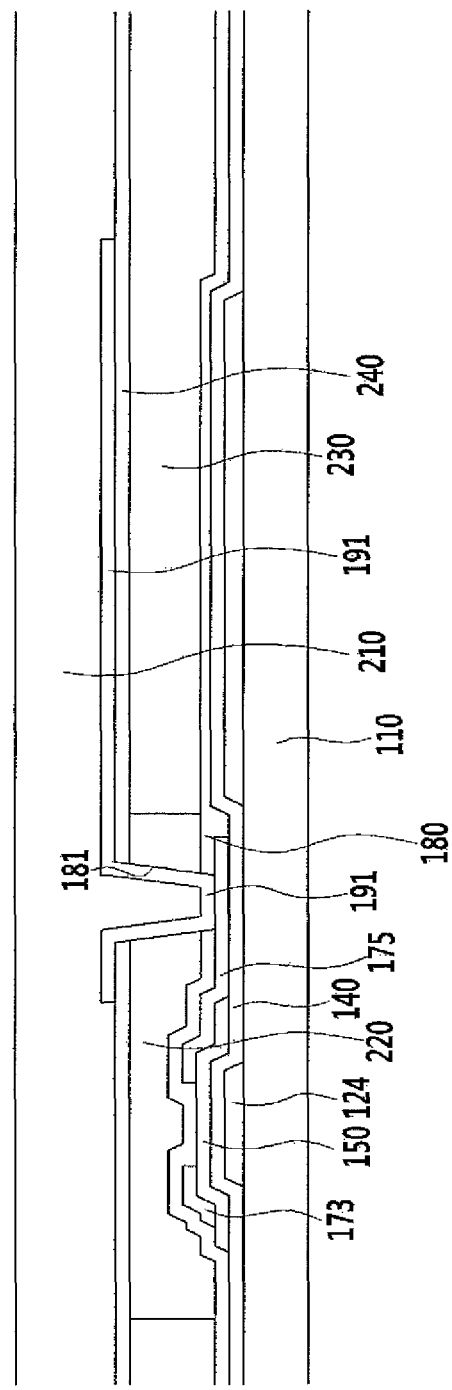
Figure 17:
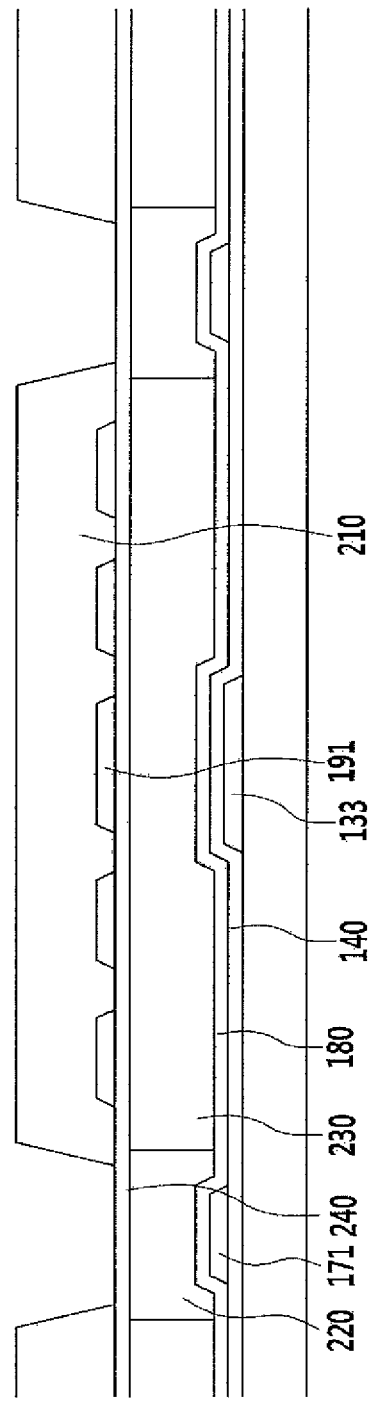

As shown in FIG. 16 and FIG. 17, a sacrificial layer 210 is formed of an organic insulating material on the pixel electrode 191 and the first insulating layer 240. The sacrificial layer 210 is patterned and thus the sacrificial layer 210 is divided between pixel areas adjacent to each other in a direction and is continuous between pixel areas adjacent to each other in another direction. For example, the sacrificial layer 210 may be separated between pixel areas adjacent to each other in the row direction and may be continuous between pixel areas adjacent to each other in the column direction. The sacrificial layer 210 formed on the data line 171 may be removed.

The sacrificial layer 210 may be made of a photosensitive polymer material, and the sacrificial layer 210 is patterned by a photo-process.

Figure 18:
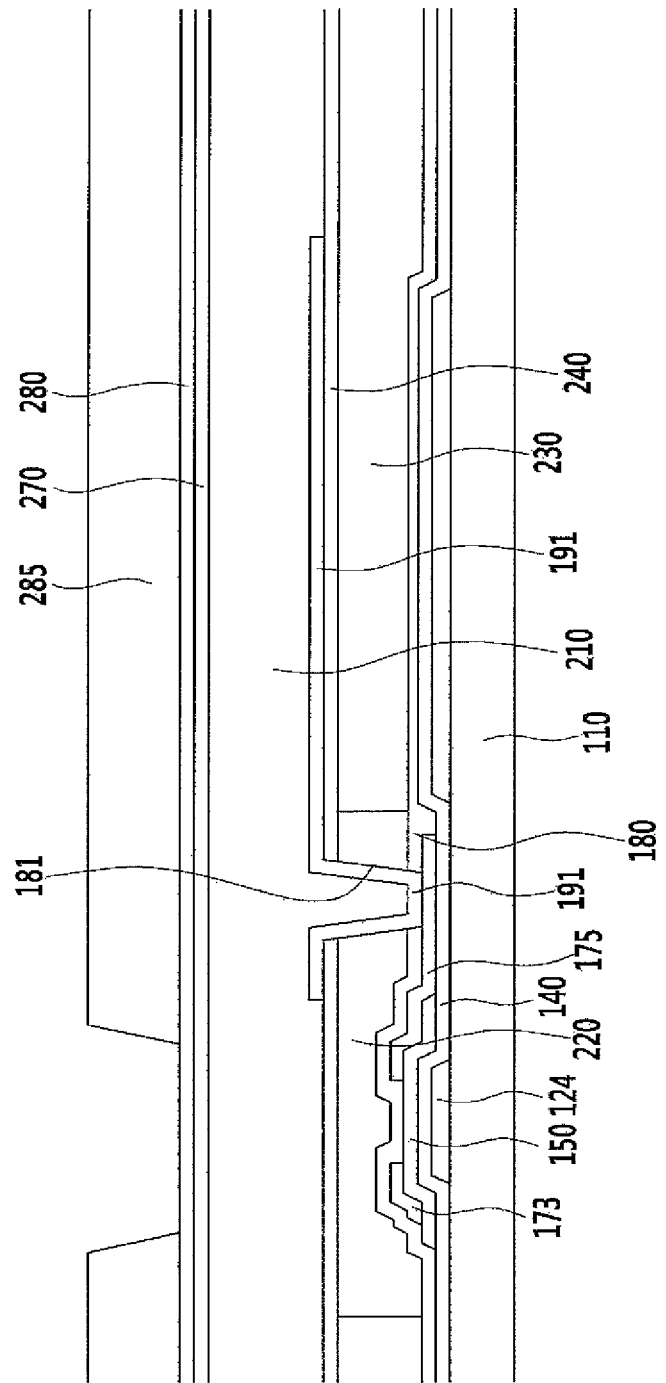
Figure 19:
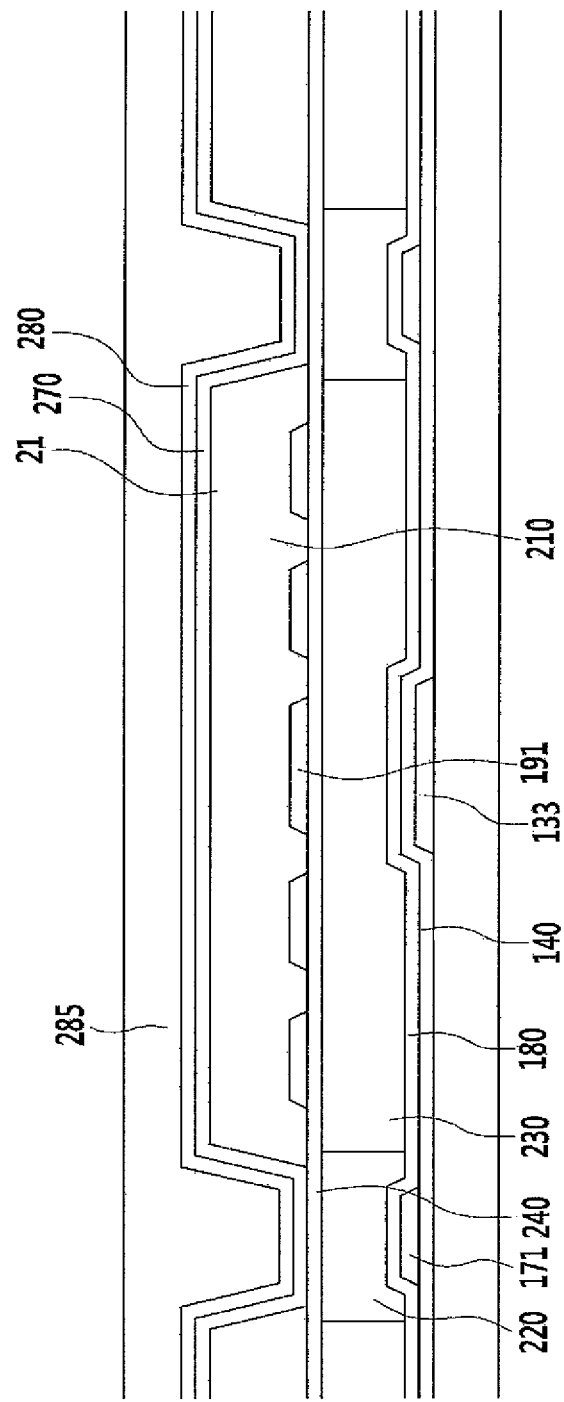

As shown in FIG. 18 and FIG. 19, a metal layer is deposited on the sacrificial layer 210 to thus form a common electrode 270.

The second insulating layer 280 is formed of an inorganic insulating material, such as silicon oxide or silicon nitride, on the common electrode 270.

The organic layer 285 is formed of an organic material on the second insulating layer 280. The roof layer 285 formed on the gate line may be removed by patterning the roof layer 285.

Figure 20:
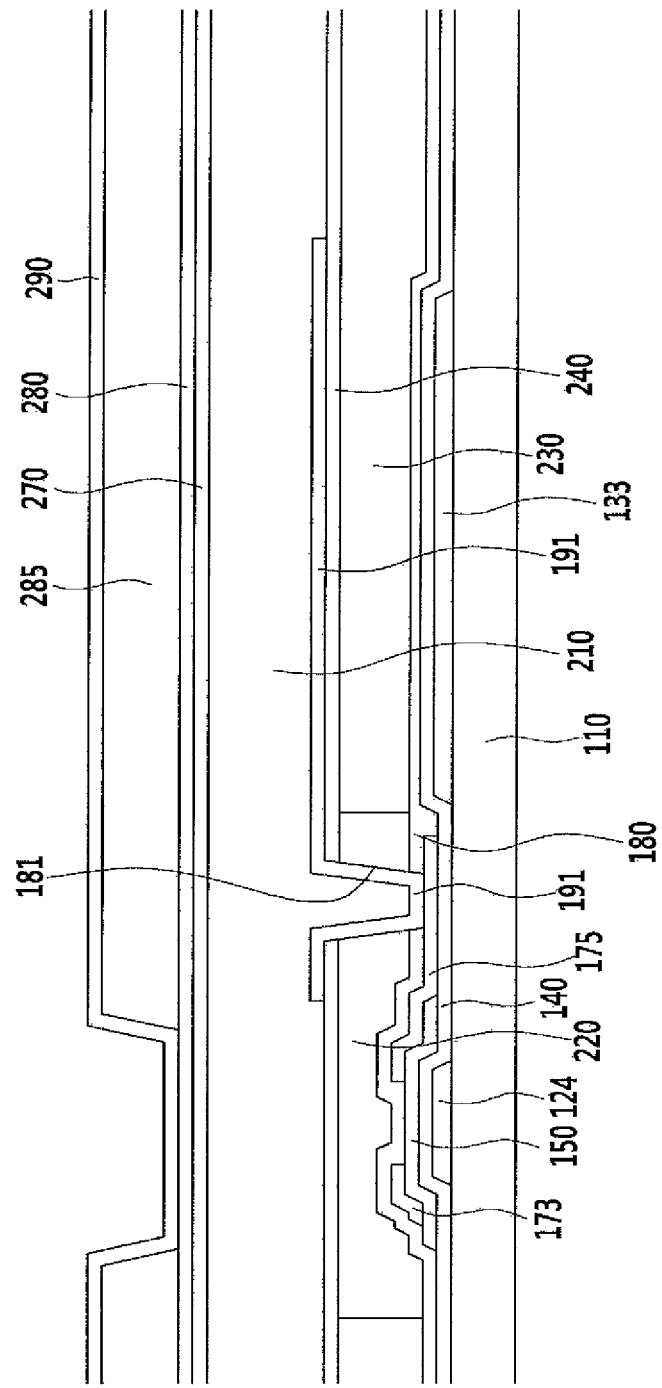
Figure 21:
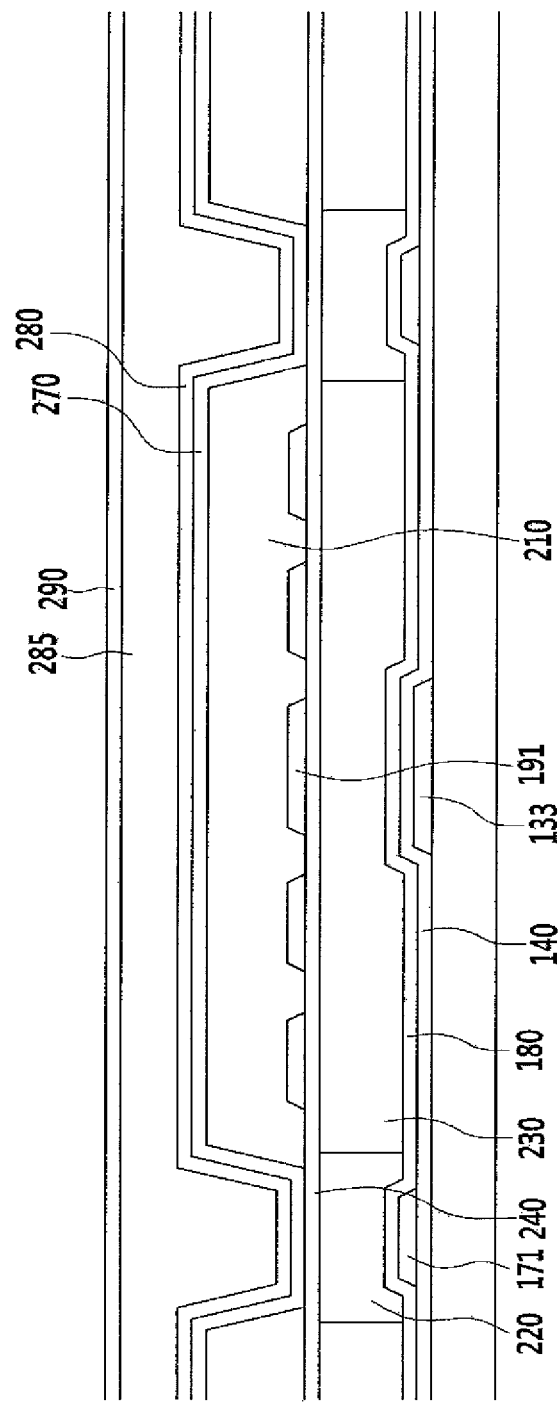

As shown in FIG. 20 and FIG. 21, the third insulating layer 290 may be formed of an inorganic insulating material, such as silicon nitride (SiNx) or silicon oxide (SiOx), on the roof layer 285. The third insulating layer 290 is formed on the patterned roof layer 285 and thus covers and protects the side surface of the roof layer 285.

Figure 22:
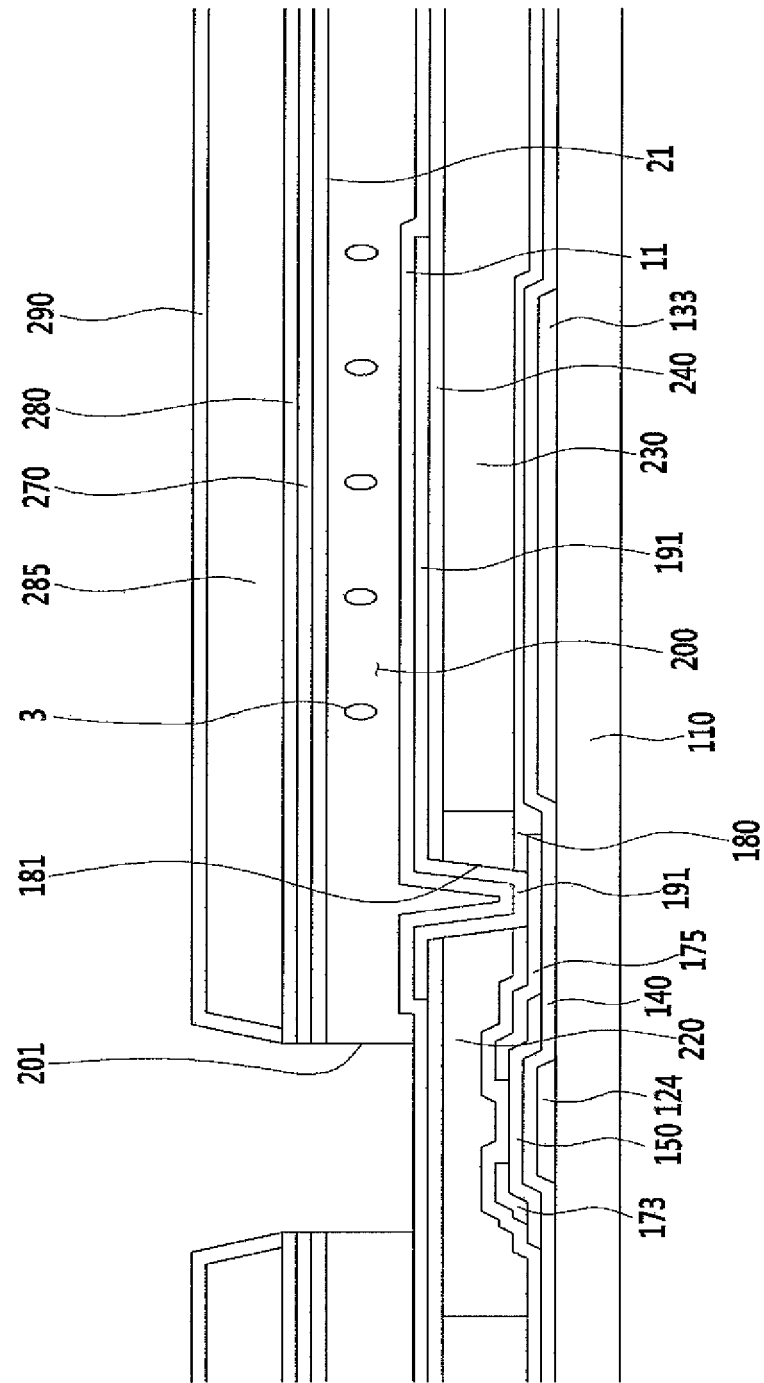
Figure 23:
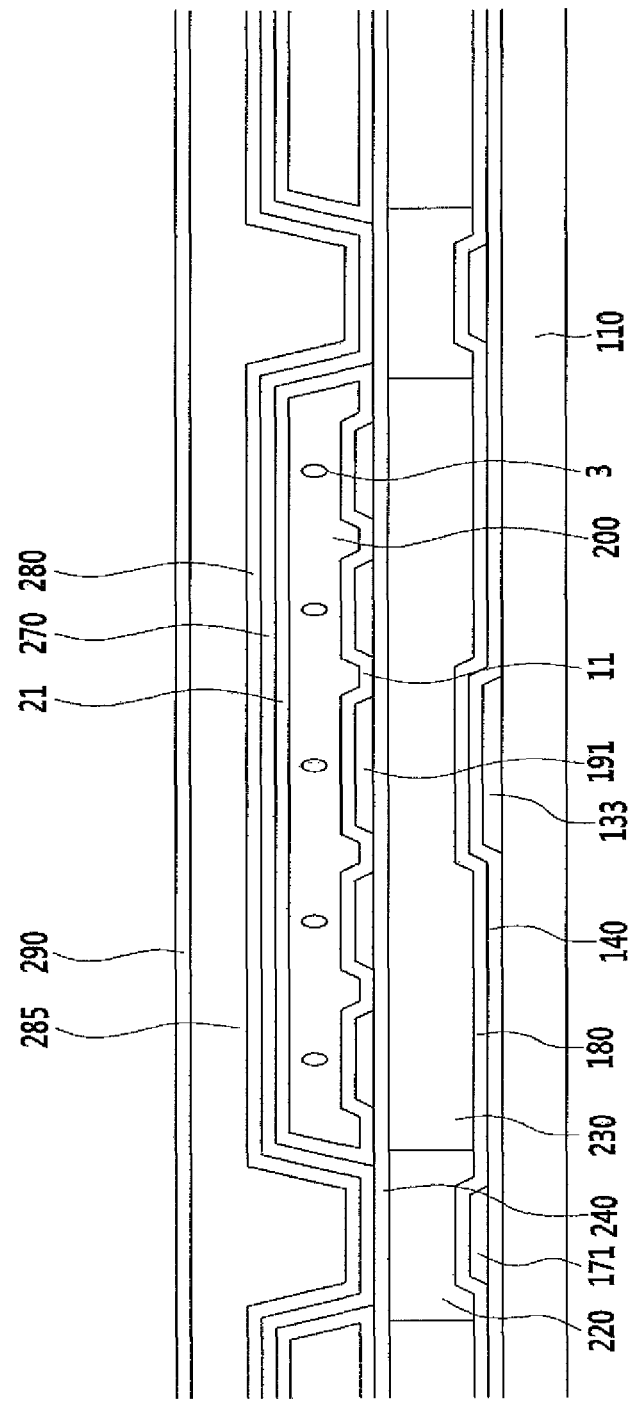

As shown in FIG. 22 and FIG. 23, the third insulating layer 290, the second insulating layer 280, and common electrode 270 are patterned to thus remove the third insulating layer 290, the second insulating layer 280, and the common electrode 270 overlapping the gate line. Accordingly, the sacrificial layer 210 positioned under a portion where the common electrode 270 is removed is exposed.

Oxygen plasma for ashing or a developer is supplied onto the substrate 110 exposed by the sacrificial layer 210, entirely removing the sacrificial layer 210. The sacrificial layer 210 is removed, thus leaving a microcavity 200. The pixel electrode 191 and the roof layer 285 are separated via the microcavity 200 interposed therebetween.

The microcavity 200 is exposed through the portion where the roof layer 285 is not formed. For example, the microcavity 200 is exposed through a liquid crystal injection hole 201. The liquid crystal injection hole 201 is formed along the gate line. Alternately, the liquid crystal injection hole 201 may be formed along the data line 171.

An aligning agent including an alignment material is deposited on the substrate 110 by a spin coating method or an inkjet method. The aligning agent is injected into the microcavity 200 through the liquid crystal injection hole 201. After injecting the aligning agent into the microcavity 200, a hardening process is performed evaporating a solution component and leaving the alignment material on the inner wall of the microcavity 200.

Accordingly, the first alignment layer 11 may be formed on the pixel electrode 191, and the second alignment layer 21 may be formed under the common electrode 270. The first alignment layer 11 and the second alignment layer 21 face each other with the microcavity 200 disposed therebetween. The first and second alignment layers 11 and 12 are connected to each other at the edge of the pixel area. For example, the common electrode 270 forms a side wall covering the side surface of the microcavity 200 in a direction substantially parallel to the data line 171 in a portion near the data line 171, and the alignment material is left on the inner surface of the side wall.

The first and second alignment layers 11 and 21 perform alignment in a direction substantially perpendicular to the first substrate 110 except for the side surface of the microcavity 200. By performing a process of irradiating ultraviolet rays to the first and second alignment layers 11 and 21, the alignment may be performed in the direction substantially parallel to the substrate 110.

Liquid crystal 3 including liquid crystal molecules is deposited by an inkjet method or a dispensing method on the substrate 110, and thus, the liquid crystal 3 is injected into the microcavity 200 through the liquid crystal injection hole 201. The liquid crystal 3 may be deposited to the liquid crystal injection holes 201 formed along odd-numbered gate lines 121, but not to the liquid crystal injection holes 201 formed along even-numbered gate lines 121. Alternatively, the liquid crystal 3 may be deposited to the liquid crystal injection holes 201 formed along the even-numbered gate lines 121, but not to the liquid crystal injection holes 201 formed along the odd-numbered gate lines 121.

When the liquid crystal 3 is deposited to the liquid crystal injection holes 201 formed along the odd-numbered gate lines 121, the liquid crystal 3 is injected into the microcavity 200 through the liquid crystal injection holes 201 by capillary force. Air flows out of the microcavity 200 through the liquid crystal injection holes 201 formed along the even-numbered gate lines 121, and thereby the liquid crystal 3 is easily injected into the microcavity 200.

A material that does not react with the liquid crystal 3 is deposited on the second insulating layer 290 forming an encapsulation layer 295. The encapsulation layer 295 covers the liquid crystal injection holes 201 where the microcavity 200 is exposed outside and seals the microcavity 200 for each pixel area.

The encapsulation layer 295 may include a multilayer structure such as a dual layer structure or a triple layer structure.

The first sub-encapsulation layer 295 is formed on the third insulating layer 290 by using an organic insulating material such as perylene, silicone, and/or a UV sheet. The first sub-encapsulation layer 295 may be thick enough to flatten the depressed portion near the liquid crystal injection hole 201. The thickness of the first sub-encapsulation layer 295a may be in a range of about 0.5 µm to about 1 µm. The thickness of the first sub-encapsulation layer 295a may include the thickness of the portion formed on the third insulating layer 290. Accordingly, the thickness of the first sub-encapsulation layer 295a formed near the liquid crystal injection hole 201 may be more than about 1 µm.

The second sub-encapsulation layer 295 is formed of the inorganic insulating material, such as silicon oxide (SiOx) or silicon nitride (SiNx), on the first sub-encapsulation layer 295. The thickness of the second sub-encapsulation layer 295b may be in a range of about 20 nm to about 50 nm.

Figure 24:
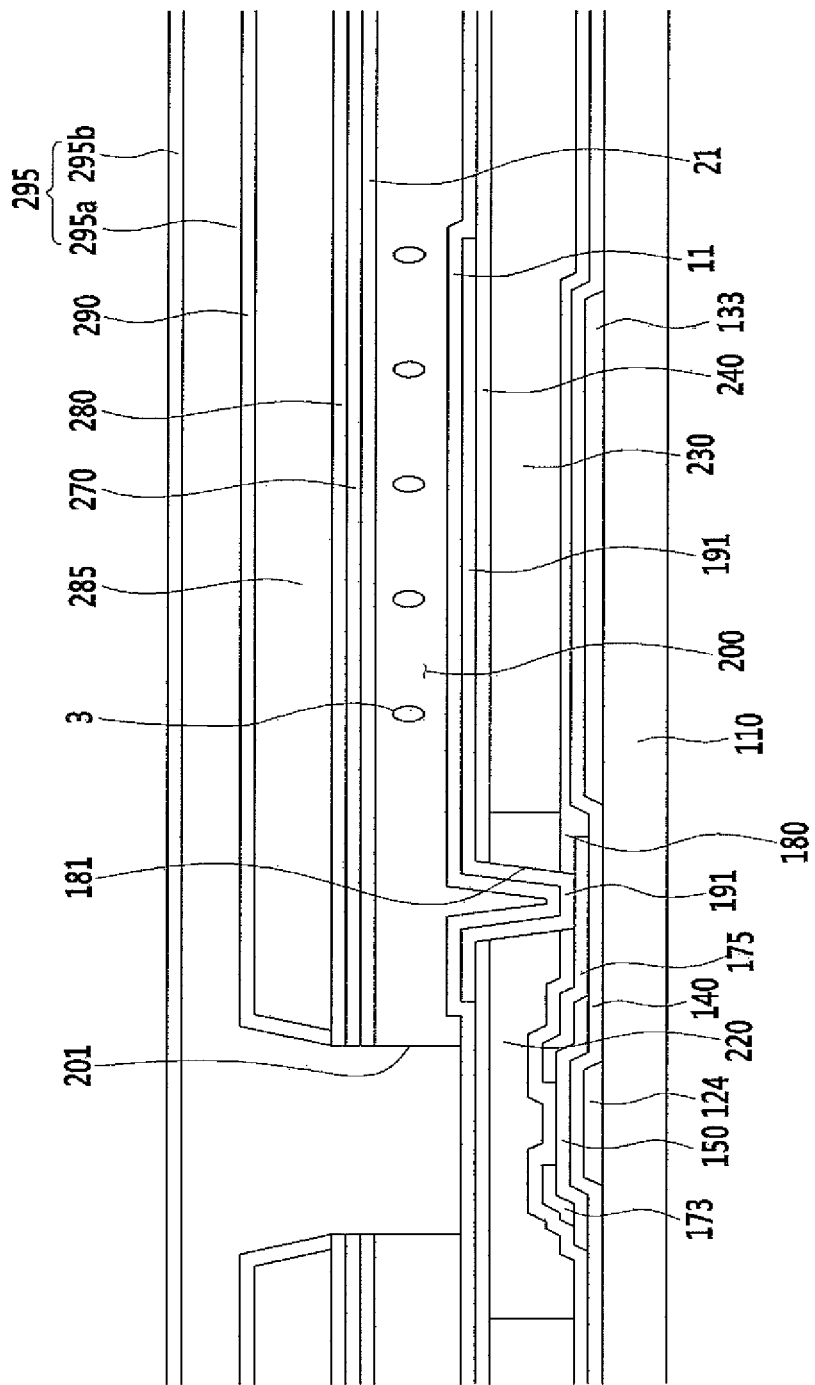
Figure 25:
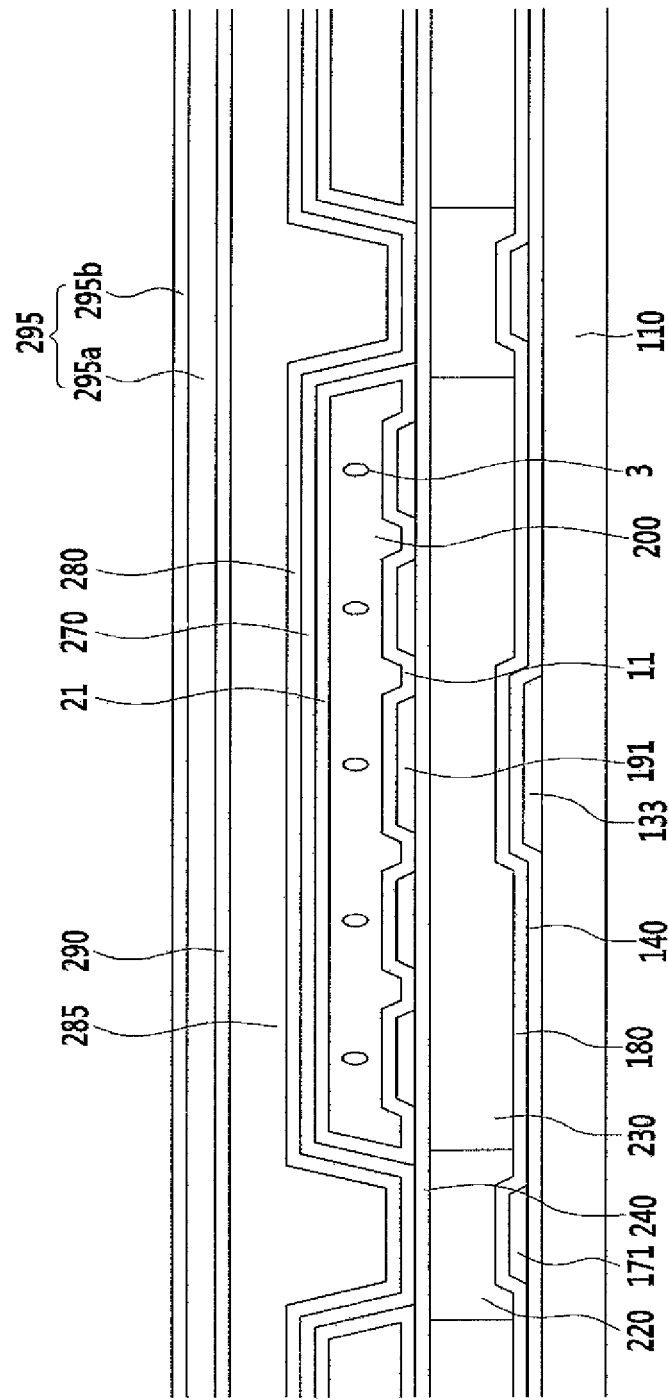

As shown in FIG. 24 and FIG. 25, the encapsulation layer 295 includes one first sub-encapsulation layer 295a and one second sub-encapsulation layer 295b. However, exemplary embodiments of the present invention are not limited thereto. According to exemplary embodiments of the present invention, the first sub-encapsulation layer 295a and the second sub-encapsulation layer 295b may be alternately formed, or a third sub-encapsulation layer may be formed of a metal oxide to thus replace the second sub-encapsulation layer 295b. According to an exemplary embodiment of the present invention, in addition to the first sub-encapsulation layer 295a and the second sub-encapsulation layer 295b, a third sub-encapsulation layer may be formed of a metal oxide. The number of material layers included in the encapsulation layer 295 and the sequence thereof may be changed.

By performing an annealing process after forming the encapsulation layer 295, the water vapor transmission rate in which moisture penetrates into the microcavity 200 may be further decreased.

Figure 26:
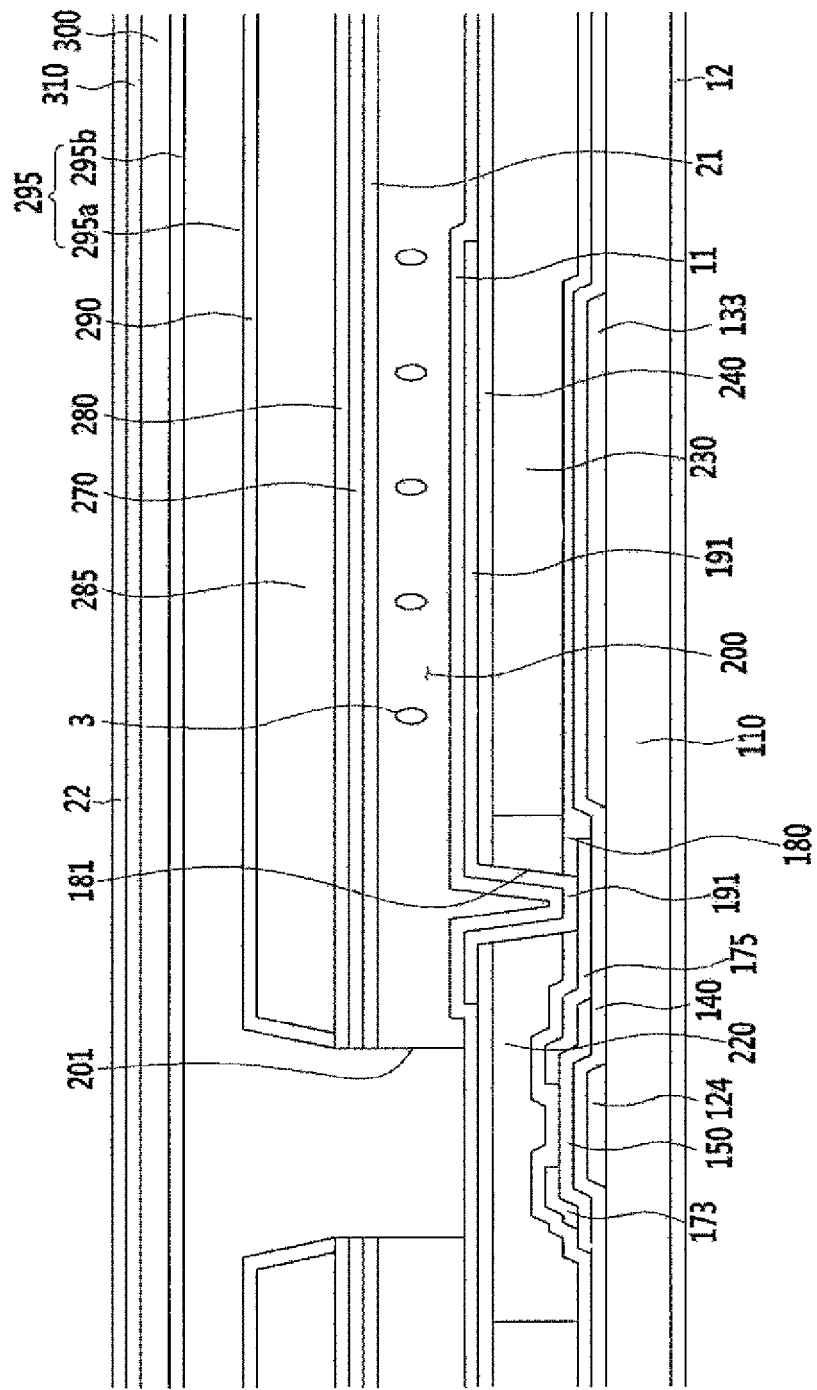
Figure 27:
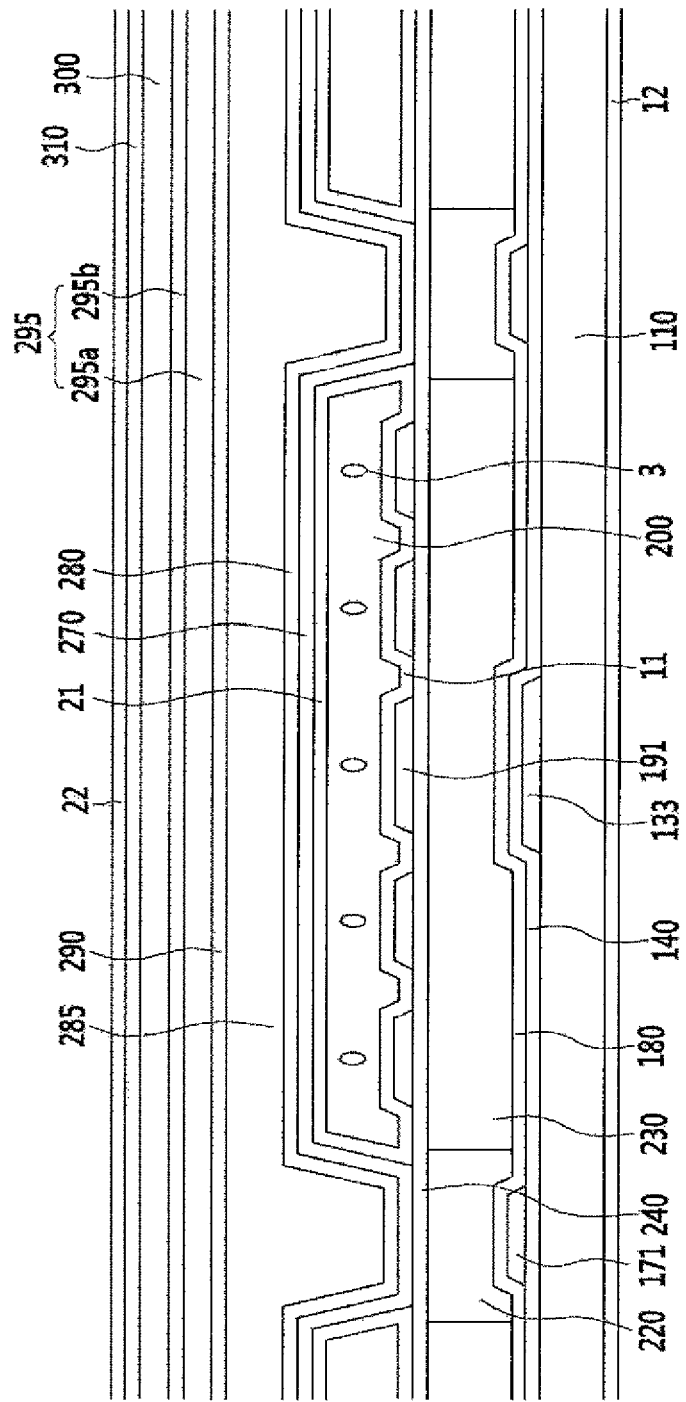

As shown in FIG. 26 and FIG. 27, a buffer layer 300 may be further formed of an organic material on the encapsulation layer 295. The buffer layer 300 may be formed of the same or substantially the same material as the first sub-encapsulation layer 295. Alternatively, the buffer layer 300 may be omitted.

A fluoro-silane-based material layer is deposited in vacuum with a thickness of about 10 Å to about 20 Å on the buffer layer 300 to thus form a self-assembled monolayer 310. The surface of the self-assembled monolayer 310 has a hydrophobic property and thus the water vapor transmission rate in which moisture penetrates into the microcavity 200 may be further decreased.

Next, polarizers 12 and 22 may be further attached on the upper and the lower surfaces of the display device. The polarizers 12 and 22 may include the first polarizer 12 and the second polarizer 22. The first polarizer 12 may be further attached on the lower surface of the substrate 110, and the second polarizer 22 may be attached on the self-assembled monolayer 310. When the buffer layer 300 and the self-assembled monolayer 310 are not formed, the second polarizer 22 may be attached on the encapsulation layer 295.

The second polarizer 22 may be more easily detached when attaching the second polarizer 22 directly on the self-assembled monolayer 310 than when attaching the second polarizer 22 directly on the encapsulation layer 295.

According to exemplary embodiments of the present invention, the display device may be manufactured using one substrate. Thus, the weight, thickness, cost, and process time thereof may be reduced.

The encapsulation layer includes a multilayer structure that may include an organic insulating material, an inorganic insulating material, and a metal oxide. Thus, moisture may be prevented from penetrating into the display device.

The self-assembled monolayer is formed on the encapsulation layer. Accordingly, penetration of moisture into the display device may be prevented and a reattaching process of the polarizer may be easily performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a substrate including a pixel area; a thin film transistor formed on the substrate;
   a pixel electrode connected to the thin film transistor and formed in the pixel area;
   a roof layer formed on the pixel electrode, wherein the roof layer is separated from the pixel electrode via a microcavity;
   a liquid crystal layer filling the microcavity;
   a liquid crystal injection hole formed in the roof layer, the liquid crystal injection hole exposing a portion of the microcavity; and
   an encapsulation layer formed on the roof layer,
   wherein the encapsulation layer includes a first sub-encapsulation layer covering the liquid crystal injection hole and sealing the microcavity, and a second sub-encapsulation layer disposed on the first sub-encapsulation layer,
   and wherein a portion of the first sub-encapsulation layer is interposed between the second sub-encapsulation layer and the roof layer.

2. The display device of claim 1, wherein
   the first sub-encapsulation layer includes an organic insulating material; and
   the second sub-encapsulation layer includes an inorganic insulating material.

3. The display device of claim 2, wherein the first sub-encapsulation layer includes perylene, silicone, or an ultra violet (UV) sheet.

4. The display device of claim 2, wherein the second sub-encapsulation layer includes a silicon oxide (SiOx) or a silicon nitride (SiNx).

5. The display device of claim 2, wherein the first sub-encapsulation layer has a thickness in a range of from about 0.5 μm to about 1 μm.

6. The display device of claim 2, wherein the second sub-encapsulation layer has a thickness in a range of from about 20 nm to about 50 nm.

7. The display device of claim 1, wherein the first sub-encapsulation layer includes an inorganic material, and the second sub-encapsulation layer includes an organic insulating material.

8. The display device of claim 2, wherein the encapsulation layer includes a plurality of first sub-encapsulation layers and a plurality of second sub-encapsulation layers, and wherein the plurality of first sub-encapsulation layers and the plurality of second sub-encapsulation layers are alternately formed.

9. The display device of claim 2, wherein the encapsulation layer further includes a third sub-encapsulation layer including a metal oxide.

10. The display device of claim 9, wherein the third sub-encapsulation layer includes aluminum oxide ($Al_2O_3$).

11. The display device of claim 9, wherein the second sub-encapsulation layer is disposed on the first sub-encapsulation layer, and the third sub-encapsulation layer is disposed on the second sub-encapsulation layer.

12. The display device of claim 9, wherein the third sub-encapsulation layer is disposed between the first sub-encapsulation layer and the second sub-encapsulation layer.

13. The display device of claim 9, wherein the encapsulation layer includes a plurality of first sub-encapsulation layers, a plurality of second sub-encapsulation layers, and a plurality of third sub-encapsulation layers.

14. The display device of claim 1, wherein the first sub-encapsulation layer includes an organic insulating material and the second sub-encapsulation layer includes a metal oxide.

15. The display device of claim 14, wherein the encapsulation layer includes a plurality of first sub-encapsulation layers and a plurality of third sub-encapsulation layers, and wherein the plurality of first sub-encapsulation layers and the plurality of third sub-encapsulation layers are alternately formed.

16. The display device of claim 1, further comprising a self-assembled monolayer (SAM) formed on the encapsulation layer.

17. The display device of claim 1, further comprising a buffer layer formed on the encapsulation layer, the buffer layer including an organic insulating material.

18. The display device of claim 17, further comprising a self-assembled monolayer (SAM) formed on the buffer layer.

19. A method manufacturing a display device, comprising:
   forming a thin film transistor on a substrate including a pixel area;
   forming a pixel electrode connected to the thin film transistor in the pixel area;
   forming a sacrificial layer on the pixel electrode;
   forming a roof layer on the sacrificial layer;
   forming a liquid crystal injection hole in the roof layer, the liquid crystal injection hole exposing a portion of the sacrificial layer;
   removing the sacrificial layer and forming a microcavity between the pixel electrode and the roof layer;
   injecting liquid crystal through the liquid crystal injection hole; and
   forming an encapsulation layer on the roof layer,
   wherein the encapsulation layer includes a first sub-encapsulation layer coverinq the liquid crystal injection hole and sealing the microcavity, and a second sub-encapsulation layer disposed on the first sub-encapsulation layer,
   and wherein a portion of the first sub-encapsulation layer is interposed between the second sub-encapsulation layer and the roof layer.

20. The method of claim 19, wherein forming the encapsulation layer includes forming a first sub-encapsulation layer including an organic insulating material, and forming a second sub-encapsulation layer including an inorganic insulating material.

21. The method of claim 19, wherein the encapsulation layer includes a plurality of first sub-encapsulation layers and a plurality of second sub-encapsulation layers, and wherein the plurality of first sub-encapsulation layers and the plurality of second sub-encapsulation layers are alternately formed.

22. The method of claim 20, wherein forming the encapsulation layer further includes forming a third sub-encapsulation layer including a metal oxide.

23. The method of claim 19, wherein forming the encapsulation layer includes forming a first sub-encapsulation layer including an organic insulating material and forming a second sub-encapsulation layer including a metal oxide.

* * * * *